United States Patent
Boyer et al.

(10) Patent No.: US 11,166,280 B2
(45) Date of Patent: **\*Nov. 2, 2021**

(54) BACKHAUL RADIO WITH ADVANCED ERROR RECOVERY

(71) Applicant: SKYLINE PARTNERS TECHNOLOGY LLC, Boulder, CO (US)

(72) Inventors: Colby Boyer, Santa Clara, CA (US); Badri Varadarajan, Mountain View, CA (US); Kevin J. Negus, Philipsburg, MT (US)

(73) Assignee: SKYLINE PARTNERS TECHNOLOGY, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,756

(22) Filed: Jun. 15, 2020

(65) Prior Publication Data
US 2020/0314848 A1  Oct. 1, 2020

Related U.S. Application Data

(63) Continuation of application No. 15/825,004, filed on Nov. 28, 2017, now Pat. No. 10,794,891, and a
(Continued)

(51) Int. Cl.
*H04W 72/04* (2009.01)
*H04W 84/12* (2009.01)
(Continued)

(52) U.S. Cl.
CPC ........ *H04W 72/0453* (2013.01); *H01Q 1/246* (2013.01); *H01Q 5/50* (2015.01);
(Continued)

(58) Field of Classification Search
None
See application file for complete search history.

(56) References Cited

U.S. PATENT DOCUMENTS

| D307,274 S | 4/1990 | Sasaki et al. |
| D335,128 S | 4/1993 | Soren |

(Continued)

FOREIGN PATENT DOCUMENTS

| EP | 2745539 | 6/2014 |
| EP | 2767102 | 8/2014 |

(Continued)

OTHER PUBLICATIONS

"AccessGate—RAN Optimization for Mobile Backhaul Systems," Product Data Sheet, Memotec, 2009, Montreal, Quebec, Canada, 2 pages.

(Continued)

*Primary Examiner* — Hassan A Phillips
*Assistant Examiner* — Gautam Sharma
(74) *Attorney, Agent, or Firm* — Jennifer Hayes; Nixon Peabody LLP

(57) ABSTRACT

A backhaul radio is disclosed that operates in multipath propagation environments such as obstructed LOS conditions with uncoordinated interference sources in the same operating band. Such a backhaul radio may use an advanced ARQ protocol, which uses an ACK_MAP, constructed by a combination of implicit and explicit signaling, and performs a combination of proactive and reactive retransmissions.

20 Claims, 10 Drawing Sheets

Related U.S. Application Data continuation-in-part of application No. 15/651,707, filed on Jul. 17, 2017, now Pat. No. 10,548,132, which is a continuation-in-part of application No. 15/403,713, filed on Jan. 11, 2017, now Pat. No. 9,713,155, which is a continuation of application No. 15/203,658, filed on Jul. 6, 2016, now Pat. No. 9,758,643, which is a continuation of application No. 14/988,578, filed on Jan. 5, 2016, now Pat. No. 9,408,215, which is a continuation of application No. 14/686,674, filed on Apr. 14, 2015, now Pat. No. 9,282,560, which is a continuation of application No. 14/337,744, filed on Jul. 22, 2014, now Pat. No. 9,055,463, which is a continuation of application No. 13/645,472, filed on Oct. 4, 2012, now Pat. No. 8,811,365, which is a continuation of application No. 13/371,366, filed on Feb. 10, 2012, now Pat. No. 8,311,023, which is a continuation of application No. 13/212,036, filed on Aug. 17, 2011, now Pat. No. 8,238,318, and a continuation-in-part of application No. 15/595,172, filed on May 15, 2017, now Pat. No. 10,051,643, which is a continuation of application No. 15/285,354, filed on Oct. 4, 2016, now Pat. No. 9,655,133, which is a continuation of application No. 15/060,013, filed on Mar. 3, 2016, now Pat. No. 9,474,080, which is a continuation of application No. 14/688,550, filed on Apr. 16, 2015, now Pat. No. 9,313,674, which is a continuation of application No. 14/498,959, filed on Sep. 26, 2014, now Pat. No. 9,049,611, and a continuation-in-part of application No. 14/337,744, filed on Jul. 22, 2014, now Pat. No. 9,055,463, which is a continuation of application No. 13/645,472, filed on Oct. 4, 2012, now Pat. No. 8,811,365, which is a continuation of application No. 13/371,366, filed on Feb. 10, 2012, now Pat. No. 8,311,023, which is a continuation of application No. 13/212,036, filed on Aug. 17, 2011, now Pat. No. 8,238,318.

(60) Provisional application No. 62/427,034, filed on Nov. 28, 2016, provisional application No. 62/430,213, filed on Dec. 5, 2016, provisional application No. 61/910,194, filed on Nov. 29, 2013.

(51) Int. Cl.

| | | |
|---|---|---|
| *H04B 7/04* | (2017.01) | |
| *H04W 52/52* | (2009.01) | |
| *H01Q 5/50* | (2015.01) | |
| *H04L 27/26* | (2006.01) | |
| *H04L 25/03* | (2006.01) | |
| *H04L 5/14* | (2006.01) | |
| *H04L 5/00* | (2006.01) | |
| *H04L 27/01* | (2006.01) | |
| *H04W 24/02* | (2009.01) | |
| *H01Q 25/00* | (2006.01) | |
| *H01Q 21/29* | (2006.01) | |
| *H01Q 21/24* | (2006.01) | |
| *H01Q 1/24* | (2006.01) | |
| *H04L 1/00* | (2006.01) | |
| *H04L 1/16* | (2006.01) | |
| *H04B 1/04* | (2006.01) | |
| *H04W 76/27* | (2018.01) | |
| *H04L 25/02* | (2006.01) | |
| *H04B 7/06* | (2006.01) | |

(52) U.S. Cl.
CPC ........... *H01Q 21/24* (2013.01); *H01Q 21/29* (2013.01); *H01Q 25/00* (2013.01); *H01Q 25/005* (2013.01); *H04B 7/04* (2013.01); *H04L 1/00* (2013.01); *H04L 1/0003* (2013.01); *H04L 1/1614* (2013.01); *H04L 1/1678* (2013.01); *H04L 5/0007* (2013.01); *H04L 5/0048* (2013.01); *H04L 5/14* (2013.01); *H04L 25/03019* (2013.01); *H04L 27/01* (2013.01); *H04L 27/2636* (2013.01); *H04L 27/2678* (2013.01); *H04W 24/02* (2013.01); *H04W 52/52* (2013.01); *H04W 72/04* (2013.01); *H04W 72/046* (2013.01); *H04W 84/12* (2013.01); *H04B 7/0617* (2013.01); *H04B 2001/0408* (2013.01); *H04L 1/0009* (2013.01); *H04L 1/1607* (2013.01); *H04L 5/0023* (2013.01); *H04L 25/0202* (2013.01); *H04L 25/03006* (2013.01); *H04L 27/265* (2013.01); *H04L 2025/03414* (2013.01); *H04W 76/27* (2018.02)

(56) References Cited

U.S. PATENT DOCUMENTS

| | | |
|---|---|---|
| D349,897 S | 8/1994 | Soren et al. |
| D373,771 S | 9/1996 | Messelhi |
| 5,579,367 A | 11/1996 | Raymond et al. |
| D376,367 S | 12/1996 | Mailandt |
| D376,600 S | 12/1996 | Vallilee et al. |
| 5,604,744 A | 2/1997 | Andersson et al. |
| 5,809,422 A | 9/1998 | Raleigh et al. |
| D401,592 S | 11/1998 | Nishimura et al. |
| 5,890,055 A | 5/1999 | Chu et al. |
| 5,973,613 A | 10/1999 | Reis |
| RE36,591 E | 2/2000 | Hayashi et al. |
| 6,253,060 B1 | 6/2001 | Komara et al. |
| 6,310,584 B1 | 10/2001 | Reece et al. |
| 6,359,596 B1 | 3/2002 | Claiborne |
| D455,420 S | 4/2002 | Arpe |
| 6,377,217 B1 | 4/2002 | Zhu et al. |
| 6,462,710 B1 | 10/2002 | Carson et al. |
| 6,463,303 B1 | 10/2002 | Zhao |
| 6,486,828 B1 | 11/2002 | Cahn et al. |
| 6,529,172 B2 | 3/2003 | Zimmerman |
| 6,539,209 B1 | 3/2003 | Dajer |
| 6,697,642 B1 | 2/2004 | Thomas |
| 6,912,195 B2 | 6/2005 | Vook et al. |
| D507,263 S | 7/2005 | Narita |
| 6,985,123 B2 | 1/2006 | Gottl |
| 6,995,712 B2 | 2/2006 | Boyanov |
| 7,027,837 B1 | 4/2006 | Uhlik et al. |
| 7,133,672 B2 | 11/2006 | Sayeedi |
| 7,171,223 B2 | 1/2007 | Herscovich et al. |
| 7,221,722 B2 | 5/2007 | Thomas et al. |
| 7,260,141 B2 | 8/2007 | Bierly et al. |
| 7,280,082 B2 | 10/2007 | Theobold et al. |
| 7,289,478 B1 | 10/2007 | Kim et al. |
| 7,292,663 B1 | 11/2007 | Van Wechel et al. |
| D565,534 S | 4/2008 | Ingalsbe et al. |
| 7,394,439 B1 | 7/2008 | Johnson et al. |
| 7,403,501 B2 | 7/2008 | Bordonaro et al. |
| D595,274 S | 6/2009 | Skottke et al. |
| D596,627 S | 7/2009 | Cho et al. |
| 7,587,177 B1 | 9/2009 | Kwong |
| 7,593,729 B2 | 9/2009 | Barak et al. |
| 7,599,290 B2 | 10/2009 | Dos Remedios et al. |
| D604,724 S | 11/2009 | Vorreiter et al. |
| 7,616,554 B2 | 11/2009 | Asai et al. |
| 7,620,370 B2 | 11/2009 | Barak et al. |
| D619,571 S | 7/2010 | Lee |
| 7,756,519 B2 | 7/2010 | Barak et al. |
| D622,256 S | 8/2010 | Lockenwitz |
| 7,848,241 B2 | 12/2010 | Natarajan et al. |
| 7,948,942 B2 | 5/2011 | Zhang et al. |

(56) References Cited

U.S. PATENT DOCUMENTS

| | | |
|---|---|---|
| 7,978,144 B2 | 7/2011 | Tanabe et al. |
| D643,025 S | 8/2011 | Podduturi |
| 8,078,109 B1 | 12/2011 | Mulcay |
| 8,175,535 B2 | 5/2012 | Mu |
| 8,238,318 B1 | 8/2012 | Negus |
| 8,249,527 B2 | 8/2012 | Rybicki |
| 8,300,590 B1 | 10/2012 | Negus et al. |
| 8,311,023 B1 | 11/2012 | Negus |
| 8,385,305 B1 | 2/2013 | Negus et al. |
| 8,422,540 B1 | 4/2013 | Negus et al. |
| 8,467,363 B2 | 6/2013 | Lea et al. |
| 8,487,813 B2 | 7/2013 | Leiba et al. |
| 8,502,733 B1 | 8/2013 | Negus et al. |
| 8,638,839 B2 | 1/2014 | Negus et al. |
| 8,649,418 B1 | 2/2014 | Negus et al. |
| D704,174 S | 5/2014 | Negus et al. |
| 8,761,100 B2 | 6/2014 | Negus et al. |
| 8,811,365 B2 | 8/2014 | Negus |
| 8,824,442 B2 | 9/2014 | Lea et al. |
| 8,830,943 B2 | 9/2014 | Negus et al. |
| 8,872,715 B2 | 10/2014 | Lea et al. |
| 8,928,542 B2 | 1/2015 | Lea et al. |
| 8,942,216 B2 | 1/2015 | Negus et al. |
| 8,948,235 B2 | 2/2015 | Negus et al. |
| 9,001,809 B2 | 4/2015 | Lea et al. |
| 9,049,611 B2 | 6/2015 | Negus et al. |
| 9,055,463 B2 | 6/2015 | Negus et al. |
| 9,178,558 B2 | 11/2015 | Lea et al. |
| 9,179,240 B2 | 11/2015 | Negus et al. |
| 9,226,295 B2 | 12/2015 | Negus et al. |
| 9,226,315 B2 | 12/2015 | Negus et al. |
| 9,282,560 B2 | 3/2016 | Negus et al. |
| 9,350,411 B2 | 5/2016 | Lea et al. |
| 9,374,822 B2 | 6/2016 | Negus et al. |
| 9,572,163 B2 | 2/2017 | Negus et al. |
| 9,577,700 B2 | 2/2017 | Lea et al. |
| 9,577,733 B2 | 2/2017 | Negus et al. |
| 9,578,643 B2 | 2/2017 | Negus |
| 9,609,530 B2 | 3/2017 | Lea et al. |
| 9,655,133 B2 | 5/2017 | Negus et al. |
| 9,712,216 B2 | 7/2017 | Lea et al. |
| 9,713,019 B2 | 7/2017 | Negus et al. |
| 9,713,155 B2 | 7/2017 | Negus et al. |
| 9,713,157 B2 | 7/2017 | Negus et al. |
| 9,876,530 B2 | 1/2018 | Negus et al. |
| 10,051,643 B2 | 8/2018 | Negus et al. |
| 10,129,888 B2 | 11/2018 | Negus et al. |
| 10,135,501 B2 | 11/2018 | Lea et al. |
| 10,237,760 B2 | 3/2019 | Negus et al. |
| 10,284,253 B2 | 5/2019 | Negus et al. |
| 10,306,635 B2 | 5/2019 | Negus et al. |
| 10,313,898 B2 | 6/2019 | Lea et al. |
| 10,506,611 B2 | 12/2019 | Negus et al. |
| 10,548,707 B2 | 1/2020 | Negus |
| 10,700,733 B2 | 6/2020 | Negus et al. |
| 10,708,918 B2 | 7/2020 | Negus et al. |
| 10,716,111 B2 | 7/2020 | Ishiguro et al. |
| 10,720,969 B2 | 7/2020 | Lea et al. |
| 2001/0003443 A1 | 6/2001 | Velazquez |
| 2001/0030939 A1 | 10/2001 | Vijayan et al. |
| 2001/0033247 A1 | 10/2001 | Singer |
| 2001/0035844 A1 | 11/2001 | Reece et al. |
| 2001/0049295 A1 | 12/2001 | Matsuoka |
| 2001/0050927 A1 | 12/2001 | Johnson |
| 2002/0008672 A1 | 1/2002 | Gothard |
| 2002/0048062 A1 | 4/2002 | Sakamoto |
| 2002/0060993 A1 | 5/2002 | Dent |
| 2002/0064141 A1 | 5/2002 | Sakakura |
| 2002/0077068 A1 | 6/2002 | Dent |
| 2002/0111182 A1 | 8/2002 | Sawyer |
| 2002/0136170 A1 | 9/2002 | Struhsaker |
| 2002/0146029 A1 | 10/2002 | Kavak et al. |
| 2003/0064753 A1 | 4/2003 | Kasapi |
| 2003/0073463 A1 | 4/2003 | Shapira |
| 2003/0086366 A1* | 5/2003 | Branlund ......... H04B 1/71052 370/208 |
| 2003/0119501 A1 | 6/2003 | Kim |
| 2003/0123384 A1 | 7/2003 | Agee |
| 2003/0123406 A1 | 7/2003 | Yavuz |
| 2003/0124976 A1 | 7/2003 | Tamaki |
| 2003/0153361 A1 | 8/2003 | Mori |
| 2003/0162566 A1 | 8/2003 | Shapira |
| 2004/0006573 A1 | 1/2004 | Takashi |
| 2004/0014429 A1 | 1/2004 | Guo |
| 2004/0018843 A1 | 1/2004 | Cerwall |
| 2004/0063406 A1 | 4/2004 | Petrus |
| 2004/0063450 A1 | 4/2004 | Uhlik |
| 2004/0095907 A1 | 5/2004 | Agee |
| 2004/0132454 A1 | 7/2004 | Trott |
| 2004/0137924 A1 | 7/2004 | Herscovich et al. |
| 2004/0151238 A1 | 8/2004 | Masenten |
| 2004/0157613 A1 | 8/2004 | Steer |
| 2004/0165650 A1 | 8/2004 | Miyazaki et al. |
| 2004/0198452 A1 | 10/2004 | Roy |
| 2004/0259497 A1 | 12/2004 | Dent |
| 2004/0259565 A1 | 12/2004 | Lucidarme |
| 2005/0026616 A1 | 2/2005 | Cavalli et al. |
| 2005/0068231 A1 | 3/2005 | Regnier et al. |
| 2005/0075078 A1 | 4/2005 | Makinen et al. |
| 2005/0164664 A1 | 7/2005 | DiFonzo |
| 2005/0202828 A1 | 9/2005 | Pecen |
| 2005/0219140 A1 | 10/2005 | Browne et al. |
| 2006/0056365 A1 | 3/2006 | Das et al. |
| 2006/0079290 A1 | 4/2006 | Seto et al. |
| 2006/0141929 A1 | 6/2006 | Lockie et al. |
| 2006/0164271 A1 | 7/2006 | Hirt et al. |
| 2006/0181456 A1 | 8/2006 | Dai |
| 2006/0209746 A1 | 9/2006 | Asai et al. |
| 2006/0253526 A1 | 11/2006 | Welch et al. |
| 2006/0273952 A1 | 12/2006 | Krikorian et al. |
| 2007/0030116 A1 | 2/2007 | Feher |
| 2007/0097899 A1 | 5/2007 | Larsson et al. |
| 2007/0140374 A1 | 6/2007 | Raleigh |
| 2007/0146225 A1 | 6/2007 | Boss et al. |
| 2007/0155431 A1 | 7/2007 | Munzner et al. |
| 2007/0165552 A1 | 7/2007 | Kasapi |
| 2007/0183439 A1 | 8/2007 | Osann |
| 2007/0195736 A1 | 8/2007 | Taira |
| 2007/0218910 A1 | 9/2007 | Hill |
| 2007/0222697 A1 | 9/2007 | Caimi |
| 2007/0243878 A1 | 10/2007 | Taira et al. |
| 2007/0264935 A1 | 11/2007 | Mohebbi |
| 2008/0014948 A1 | 1/2008 | Scheinert |
| 2008/0043882 A1 | 2/2008 | Zhang et al. |
| 2008/0080364 A1 | 4/2008 | Barak et al. |
| 2008/0090575 A1 | 4/2008 | Barak et al. |
| 2008/0159212 A1 | 7/2008 | Zhang et al. |
| 2008/0181183 A1 | 7/2008 | Gale |
| 2008/0181282 A1 | 7/2008 | Wala et al. |
| 2008/0240307 A1 | 10/2008 | Wang et al. |
| 2008/0242232 A1 | 10/2008 | Zavadsky et al. |
| 2008/0274745 A1 | 11/2008 | Barak et al. |
| 2009/0010238 A1 | 1/2009 | Barak et al. |
| 2009/0029645 A1 | 1/2009 | Leroudier |
| 2009/0052411 A1 | 2/2009 | Leung et al. |
| 2009/0067526 A1 | 3/2009 | Ratermann et al. |
| 2009/0111463 A1 | 4/2009 | Simms et al. |
| 2009/0121963 A1 | 5/2009 | Greene |
| 2009/0143017 A1 | 6/2009 | Barak et al. |
| 2009/0252134 A1 | 10/2009 | Schlicht et al. |
| 2009/0252250 A1 | 10/2009 | Heath, Jr. |
| 2009/0264087 A1 | 10/2009 | Chae |
| 2009/0274130 A1 | 11/2009 | Boch |
| 2009/0286506 A1 | 11/2009 | Gu |
| 2009/0304055 A1 | 12/2009 | Nino et al. |
| 2009/0312022 A1 | 12/2009 | Viorel et al. |
| 2009/0323621 A1 | 12/2009 | Touboul et al. |
| 2010/0009694 A1 | 1/2010 | Fischer |
| 2010/0033396 A1 | 2/2010 | Tanabe et al. |
| 2010/0046421 A1 | 2/2010 | Adams |
| 2010/0046439 A1 | 2/2010 | Chen et al. |
| 2010/0046462 A1 | 2/2010 | Uwano |
| 2010/0056205 A1 | 3/2010 | Fuss |

(56) References Cited

U.S. PATENT DOCUMENTS

| | | |
|---|---|---|
| 2010/0087158 A1 | 4/2010 | Chen |
| 2010/0104038 A1 | 4/2010 | Stager |
| 2010/0128630 A1 | 5/2010 | Barak et al. |
| 2010/0157970 A1 | 6/2010 | Gotman et al. |
| 2010/0172422 A1 | 7/2010 | Maruyama |
| 2010/0202391 A1 | 8/2010 | Palanki et al. |
| 2010/0261423 A1 | 10/2010 | Stanforth et al. |
| 2010/0269143 A1 | 10/2010 | Rabowsky |
| 2010/0272006 A1 | 10/2010 | Bertrand et al. |
| 2010/0302101 A1 | 12/2010 | Leiba et al. |
| 2010/0303015 A1 | 12/2010 | Ko |
| 2010/0309048 A1 | 12/2010 | Polisetty et al. |
| 2011/0044279 A1 | 2/2011 | Johansson et al. |
| 2011/0065448 A1 | 3/2011 | Song |
| 2011/0070855 A1 | 3/2011 | Mariotti |
| 2011/0085525 A1 | 4/2011 | Patini |
| 2011/0090885 A1 | 4/2011 | Safavi |
| 2011/0103292 A1 | 5/2011 | Pasad et al. |
| 2011/0164186 A1 | 7/2011 | Sadek |
| 2011/0182174 A1 | 7/2011 | Pi et al. |
| 2011/0206155 A1 | 8/2011 | Fujimura et al. |
| 2011/0235514 A1 | 9/2011 | Huang et al. |
| 2011/0250852 A1 | 10/2011 | Greene |
| 2012/0058777 A1 | 3/2012 | Nguyen et al. |
| 2012/0063472 A1 | 3/2012 | Le Pallec et al. |
| 2012/0108284 A1* | 5/2012 | Patel ............ H04B 1/0003 455/509 |
| 2012/0122477 A1 | 5/2012 | Sadek et al. |
| 2012/0135724 A1 | 5/2012 | Lewis et al. |
| 2012/0184222 A1 | 7/2012 | Seok |
| 2012/0201153 A1 | 8/2012 | Bharadia et al. |
| 2012/0201173 A1 | 8/2012 | Jain et al. |
| 2012/0213086 A1 | 8/2012 | Matsuura et al. |
| 2012/0224574 A1* | 9/2012 | Hoymann ........ H04L 1/1607 370/389 |
| 2013/0044028 A1 | 2/2013 | Lea et al. |
| 2013/0089037 A1 | 4/2013 | Negus et al. |
| 2013/0089041 A1 | 4/2013 | Negus et al. |
| 2013/0089083 A1 | 4/2013 | Negus et al. |
| 2013/0095765 A1 | 4/2013 | Greene |
| 2013/0137444 A1 | 5/2013 | Ozluturk |
| 2013/0207841 A1 | 8/2013 | Negus et al. |
| 2013/0288593 A1 | 10/2013 | Norin et al. |
| 2014/0050126 A1 | 2/2014 | Naden |
| 2014/0120966 A1 | 5/2014 | Fischer et al. |
| 2014/0184455 A1 | 7/2014 | Lea et al. |
| 2015/0016561 A1 | 1/2015 | Negus et al. |
| 2015/0084826 A1 | 3/2015 | Lea et al. |
| 2015/0156777 A1 | 6/2015 | Negus et al. |
| 2015/0200709 A1 | 7/2015 | Negus et al. |
| 2015/0223082 A1 | 8/2015 | Negus et al. |
| 2015/0230105 A1 | 8/2015 | Negus et al. |
| 2015/0372738 A1 | 12/2015 | Negus et al. |
| 2016/0004522 A1 | 1/2016 | Connelly |
| 2016/0013831 A1 | 1/2016 | Lea et al. |
| 2016/0095107 A1 | 3/2016 | Negus et al. |
| 2016/0095121 A1 | 3/2016 | Negus et al. |
| 2016/0135191 A1 | 5/2016 | Negus et al. |
| 2016/0135192 A1 | 5/2016 | Negus |
| 2016/0192374 A1 | 6/2016 | Negus |
| 2016/0248467 A1 | 8/2016 | Lea et al. |
| 2016/0285532 A1 | 9/2016 | Negus et al. |
| 2016/0285611 A1 | 9/2016 | Fischer et al. |
| 2016/0316477 A1 | 10/2016 | Negus et al. |
| 2017/0026978 A1 | 1/2017 | Negus et al. |
| 2017/0126291 A1 | 5/2017 | Negus et al. |
| 2017/0127399 A1 | 5/2017 | Negus et al. |
| 2017/0127421 A1 | 5/2017 | Negus et al. |
| 2017/0201025 A1 | 7/2017 | Lea et al. |
| 2017/0251484 A1 | 10/2017 | Negus |
| 2017/0311307 A1 | 10/2017 | Negus |
| 2017/0317725 A1 | 11/2017 | Lea |
| 2017/0318482 A1 | 11/2017 | Negus |
| 2017/0318571 A1 | 11/2017 | Negus |
| 2017/0318589 A1 | 11/2017 | Negus |
| 2018/0084553 A1 | 3/2018 | Boyer |
| 2018/0092099 A1 | 3/2018 | Ishiguro |
| 2018/0145721 A1 | 5/2018 | Negus |
| 2019/0007950 A1 | 1/2019 | Negus |
| 2019/0044581 A1 | 2/2019 | Lea et al. |
| 2019/0045492 A1 | 2/2019 | Negus et al. |
| 2019/0159045 A1 | 5/2019 | Negus |
| 2019/0190565 A1 | 6/2019 | Negus et al. |
| 2019/0246402 A1 | 8/2019 | Negus et al. |
| 2019/0253903 A1 | 8/2019 | Lea et al. |
| 2020/0313730 A1 | 10/2020 | Lea et al. |
| 2020/0314833 A1 | 10/2020 | Negus et al. |
| 2020/0314849 A1 | 10/2020 | Ishiguro et al. |
| 2020/0322000 A1 | 10/2020 | Negus |
| 2020/0329467 A1 | 10/2020 | Negus et al. |
| 2020/0383107 A1 | 12/2020 | Negus et al. |
| 2020/0396622 A1 | 12/2020 | Negus et al. |

FOREIGN PATENT DOCUMENTS

| | | |
|---|---|---|
| EP | 2839693 | 2/2015 |
| EP | 2843863 A1 | 3/2015 |
| WO | WO 2007/146685 | 12/2007 |
| WO | WO 2008007375 A2 | 1/2008 |
| WO | WO 2011030960 A1 | 3/2011 |
| WO | WO 2011080299 A3 | 7/2011 |
| WO | WO 2013025413 A1 | 2/2013 |
| WO | WO 2013055947 A1 | 4/2013 |
| WO | WO 2013158237 A2 | 10/2013 |
| WO | WO 2014040083 A2 | 3/2014 |

OTHER PUBLICATIONS

"Advances in Backhaul Synchronization—Maximizing ROI," Application Brief, Symmetricom Inc., 2008, 6 pages.

"Carrier Ethernet Services Overview," Presentation, MEF, Aug. 2008, 32 pages.

"Clock Distribution and Synchronization over Ethernet: IEEE1588v2 and SyncE," Presentation, VITESSE, Sep. 2009, 9 pages.

"Clock Synchronization in Carrier Ethernet Networks—Synchronous Ethernet and 1588v2 on Juniper Networks MX Series 3D Universal Edge Routers," White Paper, Juniper Networks, Inc., 2010, 11 pages.

"DAN2400-PTP—Open SoC Platform for Sub-6GHz Wireless Point-to-Point Systems," DesignArt Networks, Jul. 2008, 2 pages.

"Doubling Capacity in Wireless Channels," Provigent Inc., 2008, 3 pages.

"Evolving Microwave Mobile Backhaul for Next-Generation Networks," White Paper, NEC Corp., Feb. 2008, 4 pages.

"GainSpan GS1011M Low Power Wi-Fi® Module Family," Product Brief—Preliminary, GainSpan Corp., 2009, 2 pages.

"HMC536MS8G / 536MS8GE—GaAs MMIC Positive Control T/R Switch, DC—6 GHz," Data Sheet, Switches—SMT, Hittite Microwave Corp., 2008, pp. 10.295-10.299.

"IEEE 1588v2 (Precision Time Protocol) Testing," Application Note, IXIA, Dec. 2009.

"Information Technology—Open Systems Interconnection—Basic Reference Model: The Basic Model," International Standard, ISO/IEC 7498-1, Second Edition Nov. 15, 1994, Corrected and Reprinted Jun. 15, 1996, 68 pages.

"MGA-21108—Broadband Fully Integrated Matched Low-Noise Amplifier MMIC," Data Sheet, Avago Technologies, Aug. 2009, 21 pages.

"MGA-22003—2.3-2.7 GHz 3x3mm WiMAX/WiBro and WiFi Linear Amplifier Module," Data Sheet, Avago Technologies, Mar. 2010, 15 pages.

"MGA-23003—3.3-3.8 GHz 3x3mm WiMAX Power Amplifier," Data Sheet, Avago Technologies, Mar. 2010, 16 pages.

"MGA-25203—5.1-5.9GHz 3x3mm WiFi and WiMAX Power Amplifier," Data Sheet, Avago Technologies, Mar. 2010, 14 pages.

"MGA-43328—High Linearity Wireless Data Power Amplifier for 2.5 to 2.7 GHz Applications," Application Note, Avago Technologies, Apr. 2010, 10 pages.

(56) References Cited

OTHER PUBLICATIONS

"MGA-43328—(2.5-2.7) GHz 29dBm High Linearity Wireless Data Power Amplifier," Data Sheet, Avago Technologies, Mar. 2010, 19 pages.
"MGA-645T6—Low Noise Amplifier with Bypass/Shutdown Mode in Low Profile Package," Data Sheet, Avago Technologies, Nov. 2009, 16 pages.
"MGA-655T6—Low Noise Amplifier with Bypass Mode in Low Profile Package," Data Sheet, Avago Technologies, Nov. 2009, 14 pages.
"MGA-675T6—Low Noise Amplifier with Shutdown Mode in Low Profile Package for 4.9-6 GHz Application," Data Sheet, Avago Technologies, Nov. 2009, 16 pages.
"Part 11: Wireless LAN Medium Access Control (MAC) and Physical Layer (PHY) Specifications Amendment 5. Enhancements for Higher Throughput," IEEE Standard for Information Technology—Telecommunications and Information Exchange Between Systems—Local and Metropolitan Area Networks—Specific Requirements, IEEE Computer Society, IEEE Std 802.11, Sep. 2009, 536 pages.
"Part 11: Wireless LAN Medium Access Control (MAC) and Physical Layer (PHY) Specifications," IEEE Standard for Information Technology—Telecommunications and Information Exchange Between Systems—Local and Metropolitan Area Networks—Specific requirements, IEEE Computer Society, IEEE Std 802.11, Jun. 2007, 1233 pages.
"Part 16: Air Interface for Fixed and Mobile Broadband Wireless Access Systems—Amendment 2: Physical and Medium Access Control Layers for Combined Fixed and Mobile Operation in Licensed Bands and Corrigendum 1," IEEE Standard for Local and Metropolitan Area Networks, IEEE Computer Society and the IEEE Microwave Theory and Techniques Society, IEEE Std 802.16e-2005 and IEEE Std 802.16/2004/Cor1-2005, Feb. 2006, 864 pages.
"Part 16: Air Interface for Fixed Broadband Wireless Access Systems," IEEE Standard for Local and Metropolitan Area Networks, IEEE Std 802.16, IEEE Computer Society and the IEEE Microwave Theory and Techniques Society, Oct. 2004, 895 pages.
"PC203—PC203-10—Basestation PHY Processor," Wireless Communications Processors, Product Brief, picoChip Flexible Wireless, 2008, 4 pages.
"SC-FDMA—Single Carrier FDMA in LTE," Data Sheet, IXIA Corp., Nov. 2009, 16 pages.
"Spectrum Sharing: The Promise and the Reality", RYSAVY Research, LLC, White Paper, Jul. 2012, pp. 1-12, available at http://www.rysavy.com.
"Technical Report: Electromagenetic Compatibility and Radio Spectrum Matters (ERM); System Reference Document (SRdoc); Mobile Broadband Services in the 2 300 MHz-2 400 MHz frequency band under Licensed Shared Access Regime", ETSI TR 103 113 V1.1.1 (Jul. 2013), European Telecommunications Standards Institute, France, 2013, pp. 1-37.
"Understanding MPLS-TP and Its Benefits," White Paper, Cisco Systems Inc., 2009, 6 pages.
"WiMAX/WiBro RF MxFE Transceiver, AD9352," Data Sheet, Analog Devices, 2007.
"WiMAX RF MxFE Transceiver, AD9352-5," Data Sheet, Analog Devices, 2008.
"WiMAX RF MxFE Transceiver, AD9353," Data Sheet, Analog Devices, 2007.
"WiMAX/WiBro RF MxFE MISO Transceiver, AD9354," Data Sheet, Analog Devices, 2008-2009.
"WiMAX/WiBro RF MxFE MISO Transceiver, AD9355," Data Sheet, Analog Devices, 2008-2009.
"WiMAX/BWA/WiBRO/LTE RF MxFE 2×2 MIMO Transceiver, AD9356," Data Sheet, Analog Devices, 2010.
"WiMAX/BWA/LTE RF MxFE 2×2 MIMO Transceiver, AD9357," Data Sheet, Analog Devices, 2010.
Baum, D.S. et al., "An Interim Channel Model for Beyond-3G Systems—Extending the 3GPP Spatial Channel Model (SCM)," IEEE, Vehicular Technology Conference, vol. 5, 2005, pp. 3132-3136.
Beller, D. et al., "MPLS-TP—The New Technology for Packet Transport Networks," Alcatel-Lucent Deutschland AG, Stuttgart, 2009, 11 pages.
Chundury, R., "Mobile Broadband Backhaul: Addressing the Challenge," Planning Backhaul Networks, Ericsson Review, 2008, pp. 4-9.
Conrat, J-M. et al., "Typical MIMO Propagation Channels in Urban Macrocells at 2 GHz," EURASIP Journal on Wireless Communications and Networking, vol. 2007, Iss. 2, Jan. 2007, 9 pages.
Coon, J.P. et al., "Adaptive Frequency-Domain Equalization for Single-Carrier Multiple-Input Multiple-Output Wireless Transmissions," IEEE Transactions on Signal Processing, vol. 53, No. 8, Aug. 2005, pp. 3247-3256.
Coon, J.P. et al., "An Investigation of MIMO Single-Carrier Frequency-Domain MMSE Equalization," Centre for Communications Research, University of Bristol, Sep. 2002, 4 pages.
Durgin, G.D., "Wideband Measurements of Angle and Delay Dispersion for Outdoor and Indoor Peer-to-Peer Radio Channels at 1920 MHz," IEEE Transactions on Antennas and Propagation, vol. 51, No. 5, May 2003, pp. 936-944.
Falconer, D.D. et al., "Broadband Wireless Using Single Carrier and Frequency Domain Equalization," Invited Overview Paper for WPMC '02, Honolulu, Oct. 2002, 10 pages.
Falconer, D.D. et al., "Frequency Domain Equalization for Single-Carrier Broadband Wireless Systems," Wideband Wireless Access Technologies to Broadband Internet, IEEE Communications Magazine, Apr. 2002, pp. 58-66.
Frost, D. et al., "MPLS Transport Profile Data Plane Architecture," Internet Engineering Task Force, RFC 5960, Aug. 2010, 16 pages.
Gao, S.C. et al., "Dual-polarized slot coupled planar antenna with wide bandwidth," IEEE Trans. Antennas and Propagation, vol. 51, No. 3, pp. 441-448, 2003.
Garner, G.M., "IEEE 1588 Version 2," ISPCS Ann Arbor '08, Sep. 2008, 89 pages.
Hentschel, T. et al., "The Digital Front-End—Bridge Between RF and Baseband-Processing," Software Defined Radio: Enabling Technologies by Walter Tuttlebee, Chapter 6, Jun. 2002, 58 pages.
Lashkarian, N., "Reconfigurable Digital Front-end Architecture for Wireless Base-Station Transmitters: Analysis, Design and FPGA Implementation," Seminar Presentation, University of California, Berkeley, Apr. 2006, 86 pages.
Nathanzon, G. et al., "Cost-Effective Backhaul Alternatives for WiMAX Networks: Challenges & Solutions," Provigent Inc., Jun. 2008, 16 pages.
Padhi, S.K. et al., "A Dual Polarized Aperture Coupled Circular Patch Antenna Using a C-Shaped Coupling Slot," IEEE Transactions on Antennas and Propagation, vol. 51, No. 12, Dec. 2003, pp. 3295-3298.
Pancaldi, F. et al., "Single-Carrier Frequency Domain Equalization—A Focus on Wireless Applications," IEEE Signal Processing Magazine, Sep. 2008, 22 pages.
Pozar, D.M. et al., "Improved coupling for aperature-coupled microstrip antennas," Electron. Lett., vol. 27, No. 13, pp. 1129-1131, 1991.
Pozar, D.M., "A microstrip antenna aperature-coupled to a microstripline," Electron. Lett., vol. 21, No. 2, pp. 49-50, 1985.
Sharony, J., "Introduction to Wireless MIMO—Theory and Applications," CEWIT—Center of Excellence in Wireless and Informational Technology, Stony Brook University, IEEE LI, Nov. 15, 2006, 63 pages.
Soffer, R., "Microwave Wireless Backhaul for LTE Networks—Meeting the Rapidly-Increasing Demand for Mobile Data," Provigent Inc., Jan. 2010, 18 pages.
Soffer, R., "ProviBand—Next Generation Wireless Backhaul Technology," Technical White Paper, Provigent Inc., Jan. 2006, 13 pages.
Stuber, G.L. et al., "Broadband MIMO-OFDM Wireless Communications," Invited Paper, Proceedings of the IEEE, vol. 92, No. 2, Feb. 2004, pp. 271-294.
Tubbax, J., "OFDM Versus Single Carrier with Cyclic Prefix: A System-based Comparison for Binary Modulation," IMEC, Belgium, Jan. 2011, 4 pages.
Part 1 of 2: "TV Whitespaces" reuse: A detailed description of the program is provided in FCC order FCC-10-174A1, and the rules for unlicensed devices that operate in the TV bands are set forth in 47

(56) References Cited

OTHER PUBLICATIONS

C.F.R. §§ 15.701-.717. See Title 47—Telecommunication; Chapter I—Federal Communications Commission; Subchapter A—General, Part 15-Radio Frequency Devices, Subpart H—Television Band Devices.
Part 2 of 2 (continued from above): (Available online at http://www.ecfr.gov/cgi-bin/text-idx?c=ecfr&SID=30f46f0753577b10de41d650c7adf941&rgn=div6&view=text&node=47:1.0.1.1.16.8&idno=47:1.0.1.1.16.8&idno=47, retrieved Feb. 25, 2015).
Partial European Search Report in European Patent Application No. 12839752.8, dated Jun. 16, 2015.
International Search Report and Written Opinion for PCT Application No. PCT/US2012/049948 dated Oct. 22, 2012.
International Search Report and Written Opinion for PCT Application No. PCT/US2012/059797 dated Jan. 2, 2013.
International Search Report and Written Opinion for PCT Application No. PCT/US2013/029731 dated May 13, 2013.
International Search Report and Written Opinion in PCT Application No. PCT/US013/48782, dated Jul. 29, 2013.
Extended European Search Report in European Patent Application No. 12824072.8, dated Jul. 15, 2015.
Extended European Search Report in European Patent Application No. 14177662.5, dated Feb. 3, 2015.

\* cited by examiner

BACKHAUL RADIO WITH ADVANCED ERROR RECOVERY

CROSS-REFERENCE TO RELATED APPLICATIONS

The present application is a Continuation Application of U.S. patent application Ser. No. 15/825,004, filed on Nov. 28, 2017, which claims priority to U.S. Provisional Patent Application Ser. No. 62/427,034, filed on Nov. 28, 2016, and U.S. Provisional Patent Application Ser. No. 62/430,213, filed on Dec. 5, 2016, both entitled "Backhaul Radio with Advanced Error Recovery", the entireties of which are hereby incorporated by reference.

U.S. patent application Ser. No. 15/825,004 is also a continuation-in-part application of U.S. patent application Ser. No. 15/651,707, filed on Jul. 17, 2017, now U.S. Pat. No. 10,548,132, which is a continuation in-part application of U.S. patent application Ser. No. 15/403,713, filed on Jan. 11, 2017, now U.S. Pat. No. 9,713,155, which is a continuation application of U.S. patent application Ser. No. 15/203,658, filed on Jul. 6, 2016, now U.S. Pat. No. 9,578,643, which is a continuation application of U.S. patent application Ser. No. 14/988,578, filed on Jan. 5, 2016, now U.S. Pat. No. 9,408,215, which is a continuation application of U.S. patent application Ser. No. 14/686,674, filed on Apr. 14, 2015, now U.S. Pat. No. 9,282,560, which is a continuation application of U.S. patent application Ser. No. 14/337,744, filed on Jul. 22, 2014, now U.S. Pat. No. 9,055,463, which is a continuation application of U.S. patent application Ser. No. 13/645,472, filed on Oct. 4, 2012, now U.S. Pat. No. 8,811,365, which is a continuation application of U.S. patent application Ser. No. 13/371,366, filed on Feb. 10, 2012, now U.S. Pat. No. 8,311,023, which is a continuation application of U.S. patent application Ser. No. 13/212,036, filed on Aug. 17, 2011, now U.S. Pat. No. 8,238,318, the disclosures of which are hereby incorporated herein by reference in their entirety.

U.S. patent application Ser. No. 15/825,004 is also a continuation-in-part application of U.S. patent application Ser. No. 15/595,172, filed on May 15, 2017, now U.S. Pat. No. 10,051,643, which is a continuation application of U.S. patent application Ser. No. 15/285,354, filed on Oct. 4, 2016, now U.S. Pat. No. 9,655,133, which is a continuation application of U.S. patent application Ser. No. 15/060,013, filed on Mar. 3, 2016, now U.S. Pat. No. 9,474,080, which is a continuation application of U.S. patent application Ser. No. 14/688,550, filed on Apr. 16, 2015, now U.S. Pat. No. 9,313,674, which is a continuation application of U.S. patent application Ser. No. 14/498,959, filed on Sep. 26, 2014, now U.S. Pat. No. 9,049,611, which claims priority to U.S. Provisional Application No. 61/910,194 filed on Nov. 29, 2013 and is a continuation-in-part application of U.S. patent application Ser. No. 14/337,744, filed on Jul. 22, 2014, now U.S. Pat. No. 9,055,463, which is a continuation application of U.S. patent application Ser. No. 13/645,472, filed on Oct. 4, 2012, now U.S. Pat. No. 8,811,365, which is a continuation application of U.S. patent application Ser. No. 13/371,366, filed on Feb. 10, 2012, now U.S. Pat. No. 8,311,023, which is a continuation application of U.S. patent application Ser. No. 13/212,036, filed on Aug. 17, 2011, now U.S. Pat. No. 8,238,318, the disclosures of which are hereby incorporated herein by reference in their entirety.

The present application is also related to U.S. patent application Ser. No. 15/651,270, filed on Jul. 17, 2017, which is a continuation of U.S. patent application Ser. No. 14/336,958, filed Jul. 21, 2014, now U.S. Pat. No. 9,001,809 and claims priority to U.S. Pat. Nos. 9,712,216, 9,577,700, 9,350,411, 9,178,558, 8,824,442, 8,467,363, 8,311,023 and 8,238,318, the disclosures of which are hereby incorporated herein by reference in their entirety.

The present application is also related to U.S. patent application Ser. No. 15/470,080, filed Mar. 27, 2017, which is a continuation of U.S. patent application Ser. No. 14/197,158, filed Mar. 4, 2014, now U.S. Pat. No. 8,928,542, and claims priority to U.S. Pat. Nos. 9,609,530, 8,811,365, 8,311,023 and 8,238,318, the disclosure of which is hereby incorporated herein by reference in its entirety.

The present application is also related to U.S. patent application Ser. No. 14/964,292, filed Dec. 9, 2015, which is a continuation of U.S. patent application Ser. No. 13/632,993, filed Oct. 1, 2012, now U.S. Pat. No. 9,226,315 and claims priority to U.S. Pat. Nos. 8,830,943, 8,761,100 and 8,300,590, the disclosures of which are hereby incorporated herein by reference in their entirety.

The present application is also related to U.S. patent application Ser. No. 15/291,968, filed on Oct. 12, 2016, which is a continuation of U.S. patent application Ser. No. 14/108,200, filed Dec. 16, 2013, now U.S. Pat. No. 8,948,235 and claims priority to U.S. Pat. Nos. 9,490,918, 8,638,839 and 8,422,540, the disclosures of which are hereby incorporated herein by reference in their entirety.

The present application is also related to U.S. patent application Ser. No. 15/651,207, filed on Jul. 17, 2017, which is a continuation-in-part of U.S. patent application Ser. No. 14/098,456, filed Dec. 5, 2013, now U.S. Pat. No. 8,989,762 and claims priority to U.S. Pat. Nos. 9,713,019, 9,055,463, 8,989,762, 8,811,365, 8,311,023 and 8,238,318, the disclosure of which is hereby incorporated herein by reference in its entirety.

The present application is also related to U.S. patent application Ser. No. 15/050,009, filed on Feb. 22, 2016, which is a continuation of U.S. patent application Ser. No. 14/151,190, filed Jan. 9, 2014, now U.S. Pat. No. 8,982,772 and claims priority to U.S. Pat. Nos. 9,345,036, 8,811,365, 8,311,023 and 8,238,318, the disclosure of which is hereby incorporated herein by reference in its entirety.

BACKGROUND

1. Field

The present disclosure relates generally to data networking and in particular to a backhaul radio for connecting remote edge access networks to core networks in RF bands subject to uncoordinated interference.

2. Related Art

Data networking traffic has grown at approximately 100% per year for over 20 years and continues to grow at this pace. Only transport over optical fiber has shown the ability to keep pace with this ever-increasing data networking demand for core data networks. While deployment of optical fiber to an edge of the core data network would be advantageous from a network performance perspective, it is often impractical to connect all high bandwidth data networking points with optical fiber at all times. Instead, connections to remote edge access networks from core networks are often achieved with wireless radio, wireless infrared, and/or copper wireline technologies.

Radio, especially in the form of cellular or wireless local area network (WLAN) technologies, is particularly advantageous for supporting mobility of data networking devices.

However, cellular base stations or WLAN access points inevitably become very high data bandwidth demand points that require continuous connectivity to an optical fiber core network.

When data aggregation points, such as cellular base station sites, WLAN access points, or other local area network (LAN) gateways, cannot be directly connected to a core optical fiber network, then an alternative connection, using, for example, wireless radio or copper wireline technologies, must be used. Such connections are commonly referred to as "backhaul."

Many cellular base stations deployed to date have used copper wireline backhaul technologies such as T1, E1, DSL, etc. when optical fiber is not available at a given site. However, the recent generations of HSPA+ and LTE cellular base stations have backhaul requirements of 100 Mb/s or more, especially when multiple sectors and/or multiple mobile network operators per cell site are considered. WLAN access points commonly have similar data backhaul requirements. These backhaul requirements cannot be practically satisfied at ranges of 300 m or more by existing copper wireline technologies. Even if LAN technologies such as Ethernet over multiple dedicated twisted pair wiring or hybrid fiber/coax technologies such as cable modems are considered, it is impractical to backhaul at such data rates at these ranges (or at least without adding intermediate repeater equipment). Moreover, to the extent that such special wiring (i.e., CAT 5/6 or coax) is not presently available at a remote edge access network location; a new high capacity optical fiber is advantageously installed instead of a new copper connection.

Rather than incur the large initial expense and time delay associated with bringing optical fiber to every new location, it has been common to backhaul cell sites, WLAN hotspots, or LAN gateways from offices, campuses, etc. using microwave radios. An exemplary backhaul connection using the microwave radios 132 is shown in FIG. 1. Traditionally, such microwave radios 132 for backhaul have been mounted on high towers 112 (or high rooftops of multi-story buildings) as shown in FIG. 1, such that each microwave radio 132 has an unobstructed line of sight (LOS) 136 to the other. These microwave radios 132 can have data rates of 100 Mb/s or higher at unobstructed LOS ranges of 300 m or longer with latencies of 5 ms or less (to minimize overall network latency).

Traditional microwave backhaul radios 132 operate in a Point to Point (PTP) configuration using a single "high gain" (typically >30 dBi or even >40 dBi) antenna at each end of the link 136, such as, for example, antennas constructed using a parabolic dish. Such high gain antennas mitigate the effects of unwanted multipath self-interference or unwanted co-channel interference from other radio systems such that high data rates, long range and low latency can be achieved. These high gain antennas however have narrow radiation patterns.

Furthermore, high gain antennas in traditional microwave backhaul radios 132 require very precise, and usually manual, physical alignment of their narrow radiation patterns in order to achieve such high performance results. Such alignment is almost impossible to maintain over extended periods of time unless the two radios have a clear unobstructed line of sight (LOS) between them over the entire range of separation. Furthermore, such precise alignment makes it impractical for any one such microwave backhaul radio to communicate effectively with multiple other radios simultaneously (i.e., a "point to multipoint" (PMP) configuration).

In wireless edge access applications, such as cellular or WLAN, advanced protocols, modulation, encoding and spatial processing across multiple radio antennas have enabled increased data rates and ranges for numerous simultaneous users compared to analogous systems deployed 5 or 10 years ago for obstructed LOS propagation environments where multipath and co-channel interference were present. In such systems, "low gain" (usually <6 dBi) antennas are generally used at one or both ends of the radio link both to advantageously exploit multipath signals in the obstructed LOS environment and allow operation in different physical orientations as would be encountered with mobile devices. Although impressive performance results have been achieved for edge access, such results are generally inadequate for emerging backhaul requirements of data rates of 100 Mb/s or higher, ranges of 300 m or longer in obstructed LOS conditions, and latencies of 5 ms or less.

In particular, "street level" deployment of cellular base stations, WLAN access points or LAN gateways (e.g., deployment at street lamps, traffic lights, sides or rooftops of single or low-multiple story buildings) suffers from problems because there are significant obstructions for LOS in urban environments (e.g., tall buildings, or any environments where tall trees or uneven topography are present).

FIG. 1 illustrates edge access using conventional unobstructed LOS PTP microwave radios 132. The scenario depicted in FIG. 1 is common for many $2^{nd}$ Generation (2G) and $3^{rd}$ Generation (3G) cellular network deployments using "macrocells". In FIG. 1, a Cellular Base Transceiver Station (BTS) 104 is shown housed within a small building 108 adjacent to a large tower 112. The cellular antennas 116 that communicate with various cellular subscriber devices 120 are mounted on the towers 112. The PTP microwave radios 132 are mounted on the towers 112 and are connected to the BTSs 104 via an nT1 interface. As shown in FIG. 1 by line 136, the radios 132 require unobstructed LOS.

The BTS on the right 104a has either an nT1 copper interface or an optical fiber interface 124 to connect the BTS 104a to the Base Station Controller (BSC) 128. The BSC 128 either is part of or communicates with the core network of the cellular network operator. The BTS on the left 104b is identical to the BTS on the right 104a in FIG. 1 except that the BTS on the left 104b has no local wireline nT1 (or optical fiber equivalent) so the nT1 interface is instead connected to a conventional PTP microwave radio 132 with unobstructed LOS to the tower on the right 112a. The nT1 interfaces for both BTSs 104a, 104b can then be backhauled to the BSC 128 as shown in FIG. 1.

In the conventional PTP radios 132, as described in greater detail in U.S. patent application Ser. No. 14/337,744 and incorporated herein, the antenna is typically of very high gain such as can be achieved by a parabolic dish so that gains of typically >30 dBi (or even sometimes >40 dBi), can be realized. Such an antenna usually has a narrow radiation pattern in both the elevation and azimuth directions. The use of such a highly directive antenna in a conventional PTP radio link with unobstructed LOS propagation conditions ensures that a modem within such radios has insignificant impairments at the receiver due to multipath self-interference and further substantially reduces the likelihood of unwanted co-channel interference due to other nearby radio links. However, the conventional PTP radio on a whole is completely unsuitable for obstructed LOS or PMP operation.

In U.S. patent application Ser. No. 14/337,744 and the related applications and patents summarized above, a novel Intelligent Backhaul Radio (or "IBR") suitable for obstructed LOS and PMP or PTP operation is described in great detail in various embodiments of those inventions. When such IBRs (or other backhaul radios) are deployed in unlicensed or lightly licensed RF spectrum bands such as the Industrial, Scientific and Medical (or "ISM") bands at, for example, 2.4-2.4835 GHz, the proposed Citizens Broadband Radio Service (or "CBRS") band at, for example, 3.55-3.7 GHz, or the Unlicensed National Information Infrastructure (or "U-NII") band at, for example, various sub-bands within 5.15-5.925 GHz, then performance of such backhaul radios may be significantly impacted by both self-interference from other such backhaul radios and from uncoordinated interference by other transmitting devices. Such uncoordinated interference sources may include government radars, wireless local area networking devices compatible with the IEEE 802.11 family of standards (or "WiFi" devices), or cordless telephones. Backhaul radios such as IBRs can advantageously mitigate the effects of such interference by exploiting the frequency, time, spatial and cancellation domains. In an exemplary backhaul radio embodiment, an IBR determines instantaneous frequency, time, spatial and cancellation domain interference mitigation techniques using a radio resource controller (or "RRC") as also described in U.S. patent application Ser. No. 14/337,744 and the related applications and patents summarized above. Even with appropriate choice of spatial and frequency resources by the RRC, errors occur in backhaul radios due to either noise or interference.

Automatic repeat request (ARQ) is a protocol that ensures lossless and in-sequence delivery of data over error-prone communication links. In principle, most ARQ protocol designs assign a unique sequence number (SN) to a service data unit (SDU) and pass the combination of the SN and SDU, as the protocol data unit (PDU), to the lower layer for transmission over the wireless link. The transmitter keeps a copy of the PDU in memory for retransmission until it receives a positive acknowledgment of its receipt from the receiver, after which the PDU copy stored in memory is discarded. The method to send PDU acknowledgment feedback and the condition for the retransmission of a PDU are specific to the design of the ARQ protocol.

For example, U.S. Pat. No. 6,778,501 discloses methods to convey block acknowledgments with bit maps. However, the techniques described in U.S. Pat. No. 6,778,501 are specific to reducing the overhead of acknowledgments in WLAN and HIPERLAN2 systems by acknowledging packets in blocks instead of sending an individual acknowledgment for every PDU transmitted. The block acknowledgments are sent within a special control-PDU (C-PDU) separate from regular data PDUs, and like data PDUs, C-PDUs are also susceptible to loss from physical layer errors. The time required to recover lost C-PDU's will greatly increase the link's latency. In contrast, for exemplary embodiments of the present invention, a portion of sliding window state are sent in every transmitted PDU so that a single loss of a PDU will not generate a significant latency penalty for the reverse link. In exemplary embodiments herein, the data carried by the PDU does not have to carry valid data or have a valid SN, but instead only effectively carry valid sliding window state information.

For example, U.S. Pat. No. 6,367,045 discloses methods to transmit, in a bandwidth efficient manner, acknowledgments/negative bitmaps for an ARQ system. However, the methods in U.S. Pat. No. 3,367,045 require the acknowledgment/negative bitmap to include a SN offset field. In contrast, for exemplary embodiments of the present invention, the SN offset is determined indirectly by the PDU's symbol position in the frame and the RF chain it is transmitted, thereby reducing the ARQ signaling within each PDU.

For example, U.S. Pat. No. 6,621,796 discloses methods for the transmitter to signal the receiver to discard PDU with SNs older than a value signaled. However, the methods in U.S. Pat. No. 6,621,796 require a special discard bit to be present in every ARQ header field and for this specific bit to be set for the receiver to discard PDUs. In contrast, for exemplary embodiments of the present invention, the transmitter can trigger a discards at the receiver by discarding the oldest SN and admitting the next SN into the SW. Once this SN is received, the receiver can discard the oldest PDU in order to accept the newly received PDU.

For example, U.S. Pat. No. 6,772,215 discloses methods to signal acknowledgments and negative acknowledgments through lists of SNs or lists of bitmaps. However, the methods in U.S. Pat. No. 6,772,215 use designated fields to distinguish ARQ feedback from regular data, and a unique header structure to determine how to interpret the feedback lists and bitmaps. In contrast, for exemplary embodiments of the present invention, the ARQ header is included in every PDU, is of fixed sized, and has a fixed format. As mentioned previously the SNs referred to by the ACK_MAP is determined by the PDU's transmit position in the frame and stream mapping.

For example, U.S. Pat. No. 7,752,519 discloses methods to send ACK maps and NACK maps, in bulk, to the transmitter. However, the methods in U.S. Pat. No. 7,752,519 use explicit NACKs to generate retransmissions of SDUs. In contrast, for exemplary embodiments of the present invention, NACKs are generated implicitly by the transmitter through the ACK_MAP feedback. A PDU not acknowledged by a relevant ACK_MAP after a specified amount of time has elapsed since the PDU's last transmission is scheduled for retransmission.

For example, U.S. Pat. No. 8,873,471 discloses the methods to construct the header fields of the Radio Link Control layer, which behaves as an ARQ protocol, of 3GPP LTE. However, the header formats defined in U.S. Pat. No. 8,873,471 is particular to the design of LTE. In contrast, for exemplary embodiments of the present invention, the ARQ header has a distinctly different format and different fields.

As outline above, what is missing in the art is an advanced ARQ protocol, disclosed herein, which uses an ACK_MAP, constructed by a combination of implicit and explicit signaling, and performs a combination of proactive and reactive retransmissions.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Some embodiments of the claimed invention are directed to measuring interference and channel conditions in the current channel as well as alternate channels while supporting data transmission on the wireless link. Backhaul radios for measuring interference and channel conditions across a multitude of frequencies and antennas to cover all possible channels are disclosed herein. Coordination between the transmitter and receiver of such radios uses a communication protocol sent with data to start operations on the same superframe boundary, including but not limited to frequency changes and blanking portions of data-carrying superframes periodically.

Additionally, embodiments of the claimed invention are directed to simultaneously optimizing interference mitigation resources in a backhaul radio in multiple of the frequency, time, spatial and cancellation domains.

According to an aspect of the invention, a backhaul radio is disclosed that includes a plurality of receive radio frequency (RF) chains, wherein each receive RF chain is capable of converting from one of a plurality of receive RF signals to a respective one of a plurality of receive chain output signals, and wherein each said receive RF signal is characterized by at least a channel center frequency and a channel bandwidth amongst either of a multitude of possible channel center frequencies or a multitude of possible channel bandwidths, respectively; a plurality of directive gain antenna elements; and one or more selectable RF connections for selectively coupling certain of the plurality of directive gain antenna elements to certain of the plurality of receive RF chains according to a set of selective coupling settings; wherein the backhaul radio is capable of determining a measure of interference associated with each of a plurality of combinations of channel center frequency, channel bandwidth, and set of selective coupling settings; wherein the backhaul radio is capable of determining or estimating one or more performance metrics associated with each combination of channel center frequency, channel bandwidth, and set of selective coupling settings, said determining or estimating of the one or more performance metrics being based at least upon the measure of interference; and wherein the backhaul radio is capable of changing from a first combination of channel center frequency, channel bandwidth, and set of selective coupling settings to a second combination of channel center frequency, channel bandwidth, and set of selective coupling settings, said changing being based at least upon an opportunity to improve at least one of the one or more performance metrics.

The backhaul radio may further include a radio resource controller, wherein the radio resource controller is capable of setting or causing to be set specific selective couplings between the certain of the plurality of directive gain antenna elements and the certain of the plurality of receive RF chains according to the set of selective coupling settings.

The backhaul radio may further include a backhaul management system agent that is capable of setting or causing to be set certain policies relevant to the radio resource controller, wherein the backhaul management system agent is capable of exchanging information with other backhaul management system agents within other backhaul radios or with one or more backhaul management system servers.

The information that can be exchanged with said backhaul management system agent can be used at least to set or cause to be set at least one of a channel center frequency, a specific selective coupling between at least one of the certain of the plurality of directive gain antenna elements and at least one of the certain of the plurality of receive RF chains, or a channel bandwidth.

The backhaul radio may further include one or more demodulator cores, wherein each demodulator core is capable of demodulating one or more of a plurality of receive symbol streams to produce one or more receive data interface streams; a frequency selective receive path channel multiplexer, interposed between the one or more demodulator cores and at least two of the plurality of receive RF chains, wherein the frequency selective receive path channel multiplexer is capable of generating the plurality of receive symbol streams from at least two of the plurality of receive chain output signals, and wherein frequency selective receive path channel multiplexer is capable of the determining the measure of interference associated with each of the plurality of combinations of channel center frequency, channel bandwidth, and set of selective coupling settings.

Each one of the plurality of receive RF chains may include at least a vector demodulator and two analog to digital converters that are capable of producing the respective one of the plurality of receive chain output signals, each said respective one of the plurality of receive chain output signals comprised of digital baseband quadrature signals.

At least one of the plurality of receive RF chains or at least one of the one or more selectable RF connections may include at least one downconverter capable of producing an intermediate frequency (IF) signal. The frequency selective receive path channel multiplexer may include at least one of a Space Division Multiple Access (SDMA) combiner or equalizer, a maximal ratio combining (MRC) combiner or equalizer, a minimum mean squared error (MMSE) combiner or equalizer, an Eigen Beam Forming (EBF) combiner or equalizer, a receive beam forming (BF) combiner or equalizer, a Zero Forcing (ZF) combiner or equalizer, a channel estimator, a Maximal Likelihood (DL) detector, an Interference Canceller (IC), a VBLAST combiner or equalizer, a Discrete Fourier Transformer (DFT), a Fast Fourier Transformer (FFT), or an Inverse Fast Fourier Transformer (IFFT).

At least one of the one or more selectable RF connections may include at least one RF switch, and wherein at least one mapping of ports in the RF switch can be changed according to the set of selective coupling settings. At least one of the one or more selectable RF connections may include at least one RF or IF combiner or splitter with at least one adjustable path, and wherein at least one of a phase or amplitude for said at least one adjustable path can be changed according to the set of selective coupling settings.

The certain of the plurality of directive gain antenna elements that can be selectively coupled to the certain of the plurality of receive RF chains may include at least a first subset with a first polarization and a second subset with a second polarization.

Certain of the plurality of directive gain antenna elements that can be selectively coupled to the certain of the plurality of receive RF chains may be arranged on a plurality of facets with one or more directive gain antenna elements per facet, and wherein each facet is oriented at a different azimuthal angle relative to at least one other facet.

The number of directive gain antenna elements that can be selectively coupled to receive RF chains may exceed the number of receive RF chains that can accept receive RF signals from the one or more selectable RF connections.

The number of directive gain antenna elements that can be selectively coupled to receive RF chains may exceed the number of the plurality of receive symbol streams.

The measure of interference associated with each of the plurality of combinations of channel center frequency, channel bandwidth, and set of selective coupling settings may include a determination of an energy in each of a plurality of frequency bins using a Discrete Fourier Transform or a Fast Fourier Transform.

The determining the measure of interference associated with each of the plurality of combinations of channel center frequency, channel bandwidth, and set of selective coupling settings may be performed during a blanking interval. The blanking interval may include a number of transmit blocks during which one or more other backhaul radios presently in a communications link with the backhaul radio are expected to substantially inhibit transmissions.

The backhaul radio may further include an arbiter control entity, wherein the arbiter control entity is capable of sending and receiving one or more control signals or frames to and from the one or more other backhaul radios in order to mutually arrange the blanking interval.

The one or more performance metrics associated with each combination of channel center frequency, channel bandwidth may include at least one of or a weighted combination of a plurality of a signal to interference plus noise ratio (SINR), a link throughput, a latency, a jitter or a frame loss rate.

If the changing from the first combination to the second combination involves changing at least one of the channel center frequency or the channel bandwidth, then said changing may occur at a superframe boundary mutually agreed upon by the backhaul radio and one or more other backhaul radios present in a communications link with the backhaul radio.

The backhaul radio may be capable of determining a channel propagation characteristics assessment for a wireless link between at least one of one or more other backhaul radios, said channel propagation characteristics assessment associated with each of a plurality of combinations of channel center frequency, channel bandwidth, and set of selective coupling settings.

The determining or estimating the one or more performance metrics associated with each combination of channel center frequency, channel bandwidth, and set of selective coupling settings may also be based at least upon the channel propagation characteristics assessment. The determining or estimating the one or more performance metrics associated with each combination of channel center frequency, channel bandwidth, and set of selective coupling settings for at least one such combination may be based upon the channel propagation characteristics assessment as determined for a different channel center frequency within an instant operating band. The one or more performance metrics associated with each combination of channel center frequency, channel bandwidth may include at least one of a signal to interference plus noise ratio (SINR) or a link throughput, or a weighted combination of a signal to interference plus noise ratio (SINR) and a link throughput, or a weighted combination at least one of a signal to interference plus noise ratio (SINR) or a link throughput plus at least one of a latency, a jitter or a frame loss rate.

The backhaul radio may further include one or more adjunct antenna elements, wherein at least one of the one or more adjunct antenna elements has a larger azimuthal coverage pattern than any of the plurality of directive gain antenna elements that can be selectively coupled to at least one of the plurality of receive RF chains.

The backhaul radio may be capable of adaptive beamforming used to combine signals from a plurality of transmit antenna elements of the same transmit chain. The adaptive beamforming is performed in a closed-loop feedback mechanism and is coordinated between the transmitter and receiver.

In accordance with another aspect of the invention, a backhaul radio is disclosed that includes a plurality of receive radio frequency (RF) chains, wherein each receive RF chain is capable of converting from one of a plurality of receive RF signals to a respective one of a plurality of receive chain output signals; a plurality of directive gain antenna elements; and an ARQ entity.

In accordance with another aspect of the invention, a fixed wireless access point is disclosed that includes a plurality of receive radio frequency (RF) chains, wherein each receive RF chain is capable of converting from one of a plurality of receive RF signals to a respective one of a plurality of receive chain output signals; a plurality of directive gain antenna elements; and an ARQ entity.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Figure 1:
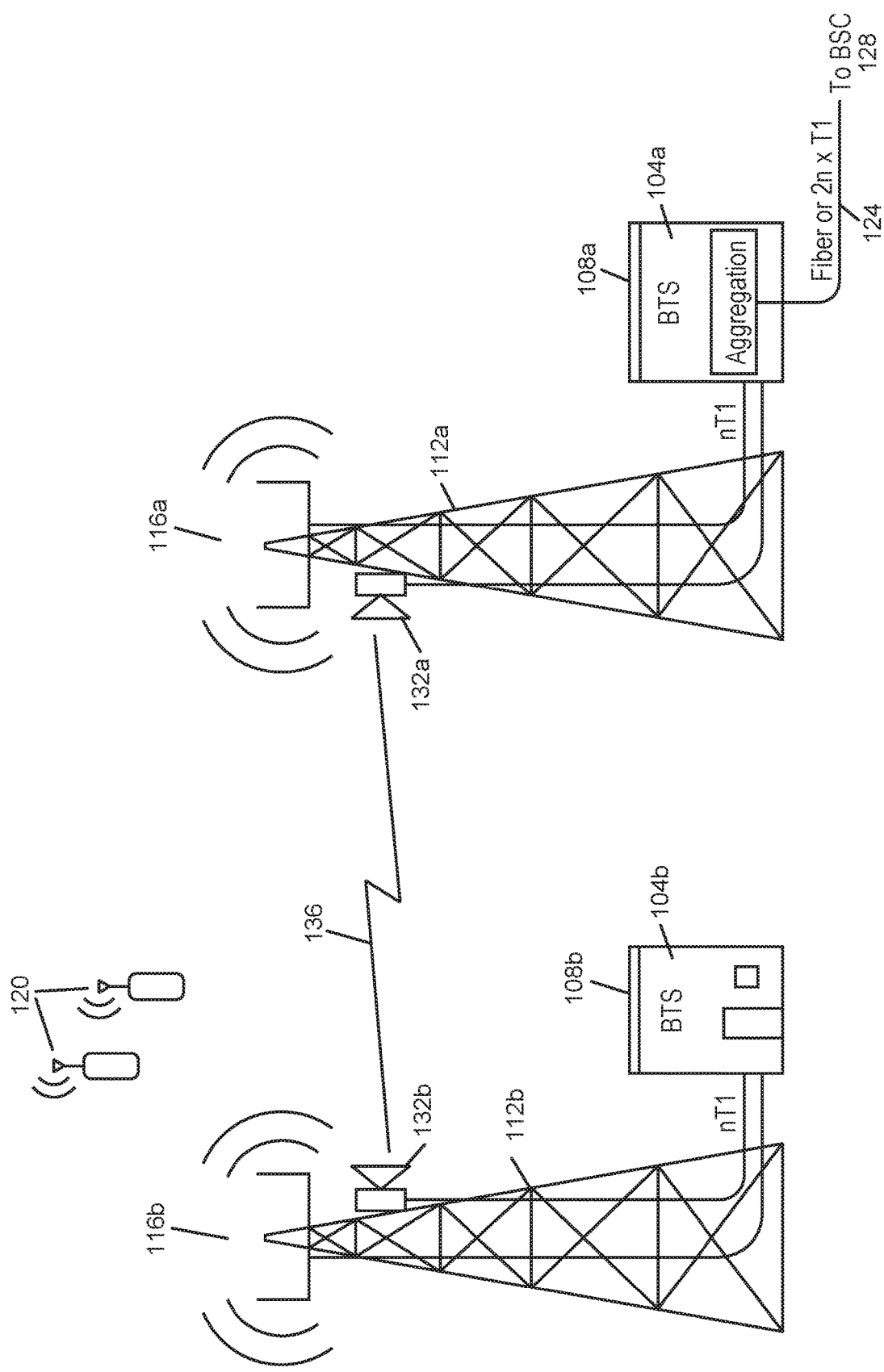
FIG. 1 is an illustration of conventional point to point (PTP) radios deployed for cellular base station backhaul with unobstructed line of sight (LOS).
Figure 2:
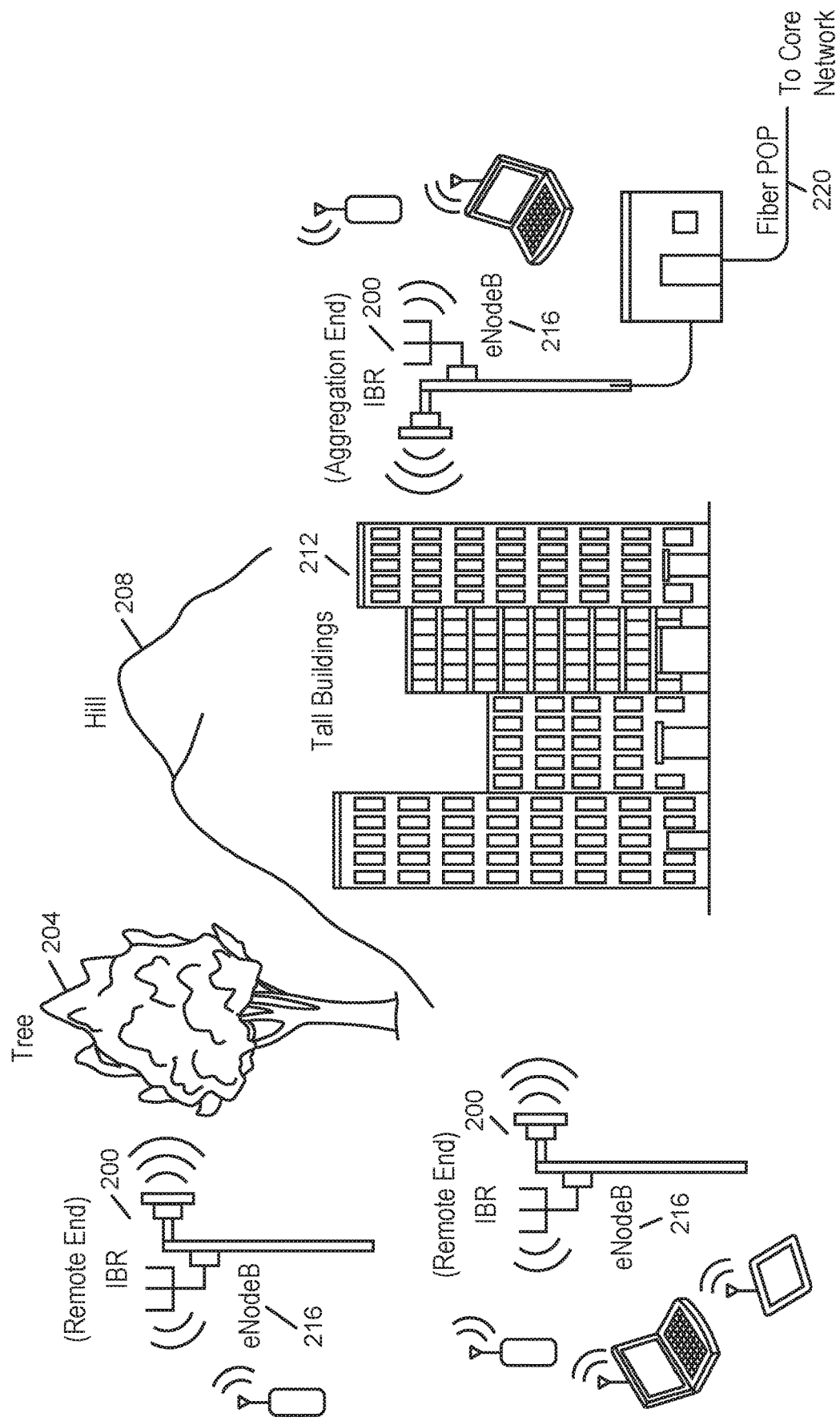
FIG. 2 is an illustration of intelligent backhaul radios (IBRs) deployed for cellular base station backhaul with obstructed LOS according to one embodiment of the invention.

FIG. 2 illustrates deployment of intelligent backhaul radios (IBRs) in accordance with an embodiment of the invention. As shown in FIG. 2, the IBRs 200 are deployable at street level with obstructions such as trees 204, hills 208, buildings 212, etc. between them. The IBRs 200 are also deployable in configurations that include point to multipoint (PMP), as shown in FIG. 2, as well as point to point (PTP). In other words, each IBR 200 may communicate with more than one other IBR 200.

For 3G and especially for $4^{th}$ Generation (4G), cellular network infrastructure is more commonly deployed using "microcells" or "picocells." In this cellular network infrastructure, compact base stations (eNodeBs) 216 are situated outdoors at street level. When such eNodeBs 216 are unable to connect locally to optical fiber or a copper wireline of sufficient data bandwidth, then a wireless connection to a fiber "point of presence" (POP) requires obstructed LOS capabilities, as described herein.

For example, as shown in FIG. 2, the IBRs 200 include an Aggregation End IBR (AE-IBR) and Remote End IBRs (RE-IBRs). The eNodeB 216 associated with the AE-IBR is typically connected locally to the core network via a fiber POP 220. The RE-IBRs and their associated eNodeBs 216 are typically not connected to the core network via a wireline connection; instead, the RE-IBRs are wirelessly connected to the core network via the AE-IBR. As shown in FIG. 2, the wireless connections between the IBRs include obstructions (i.e., there may be an obstructed LOS connection between the RE-IBRs and the AE-IBR).

Figure 3:
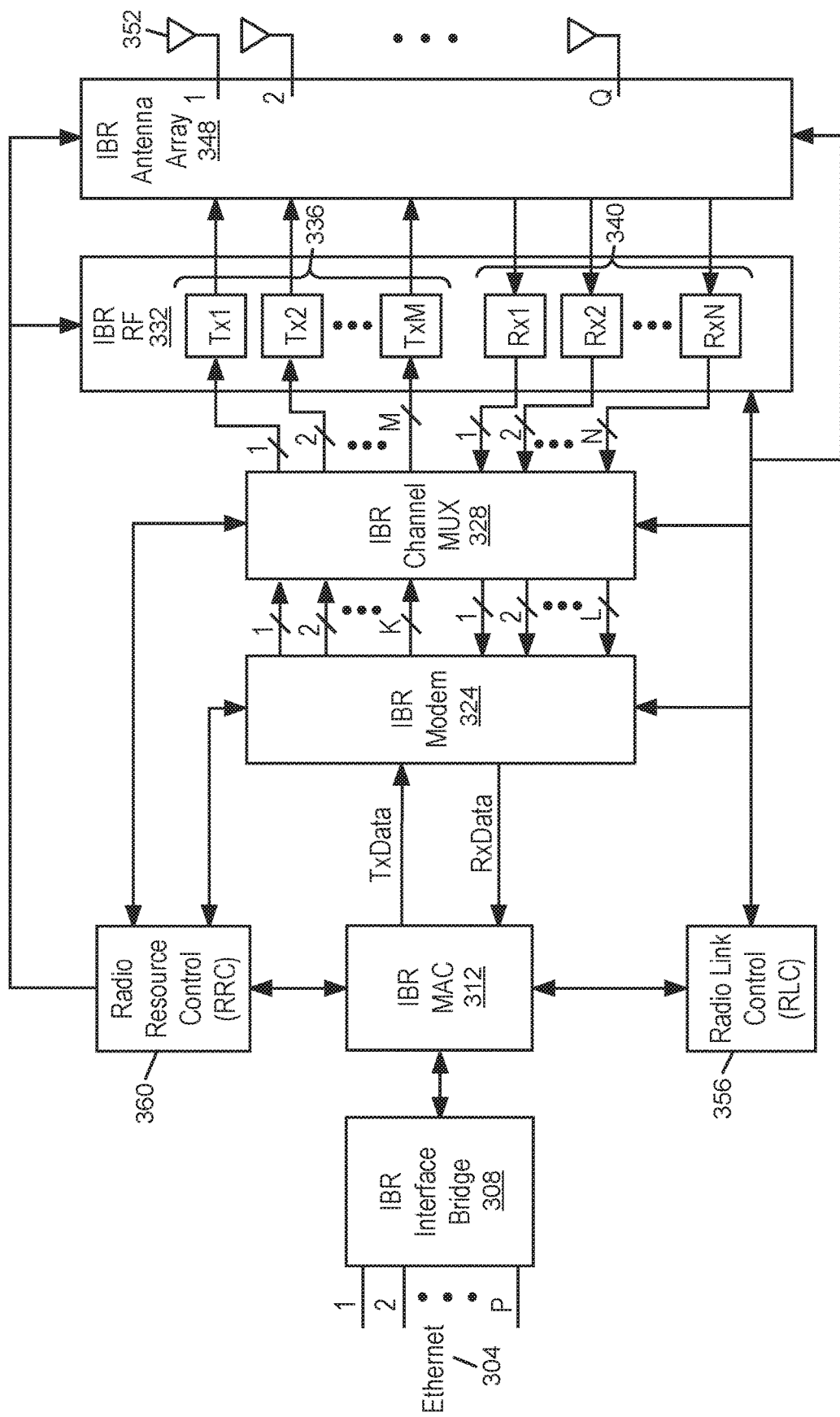
FIG. 3 is a block diagram of an IBR according to one embodiment of the invention.
Figure 7:
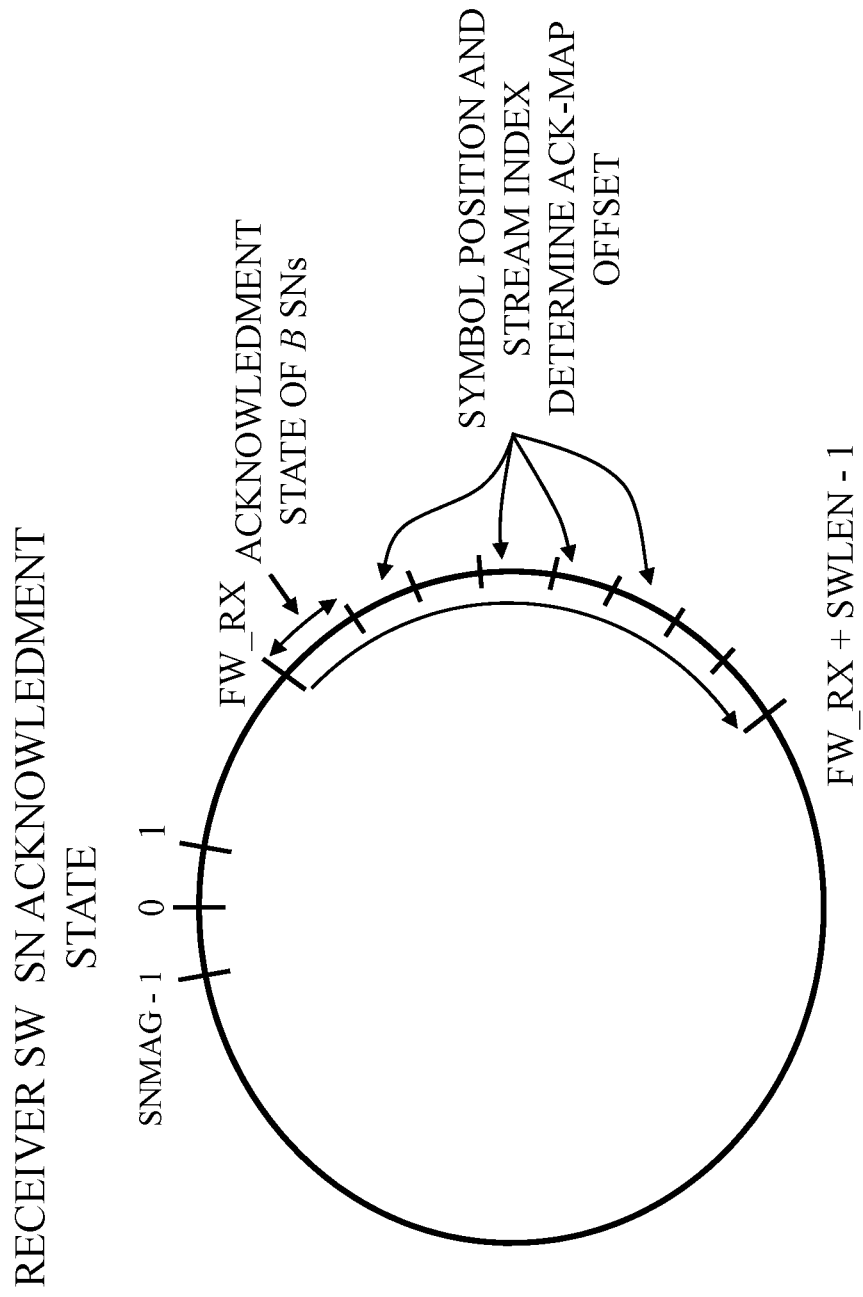
FIG. 7 shows a method to map the ACK_MAP to the acknowledgment state in the receiver's sliding window.

FIG. 3 illustrates an exemplary embodiment of the IBRs 200 shown in FIG. 2. In FIG. 3, the IBRs 200 include interfaces 304, interface bridge 308, MAC 312, modem 324, channel MUX 328, RF 332, which includes Tx1 . . . TxM 336 and Rx1 . . . RxN 340, antenna array 348 (includes multiple antennas 352), a Radio Link Controller (RLC) 356 and a Radio Resource Controller (RRC) 360. The IBR may optionally include an Intelligent Backhaul Management System (IBMS) agent as shown in FIG. 7 of U.S. patent application Ser. No. 14/337,744. It will be appreciated that the components and elements of the IBRs may vary from that illustrated in FIG. 3. U.S. patent application Ser. No. 14/337,744 and the related applications and patents summarized above describe in detail the various elements of the IBR including their structural and operational features in numerous different embodiments both as depicted in FIG. 3 and as depicted with various additional elements not shown in FIG. 3. A brief summary of certain elements of the IBR is also provided herein.

The external interfaces of the IBR (i.e., the IBR Interface Bridge 308 on the wireline side and the IBR Antenna Array 348 (including antennas 352) on the wireless side) are a starting point for describing some fundamental differences between the numerous different embodiments of the IBR 200 and either conventional PTP radios or other commonly known radio systems, such as those built to existing standards including 802.11n (WiFi), 802.11ac (WiFi), 802.16e (WiMax) or 4G LTE.

In some embodiments, the IBR Interface Bridge 308 physically interfaces to standards-based wired data networking interfaces 304 as Ethernet 1 through Ethernet P. "P" represents a number of separate Ethernet interfaces over twisted-pair, coax or optical fiber. The IBR Interface Bridge 308 can multiplex and buffer the P Ethernet interfaces 304 with the IBR MAC 312. In exemplary embodiments, the IBR Interface Bridge 308 preserves "Quality of Service" (QoS) or "Class of Service" (CoS) prioritization as indicated, for example, in IEEE 802.1q 3-bit Priority Code Point (PCP) fields within the Ethernet frame headers, such that either the IBR MAC 312 schedules such frames for transmission according to policies configured within or communicated to the IBR 200, or the IBR interface bridge 308 schedules the transfer of such frames to the IBR MAC 312 such that the same net effect occurs. In other embodiments, the IBR interface bridge 308 also forwards and prioritizes the delivery of frames to or from another IBR over an instant radio link based on Multiprotocol Label Switching (MPLS) or Multiprotocol Label Switching Transport Profile (MPLS-TP). U.S. patent application Ser. No. 14/337,744 provides additional description of exemplary embodiments of the interfaces 304 and the interface bridge 308 of the IBR 200. U.S. patent application Ser. No. 13/632,993 provides additional description of exemplary embodiments of an IBMS that includes an IBMS Agent in communication with or IBMS components and the IBR Interface Bridge 308 as well as MAC 312 and/or RRC 360. U.S. patent application Ser. No. 13/632,993 also describes an IBR with an integrated Carrier Ethernet switch.

Figure 3B:
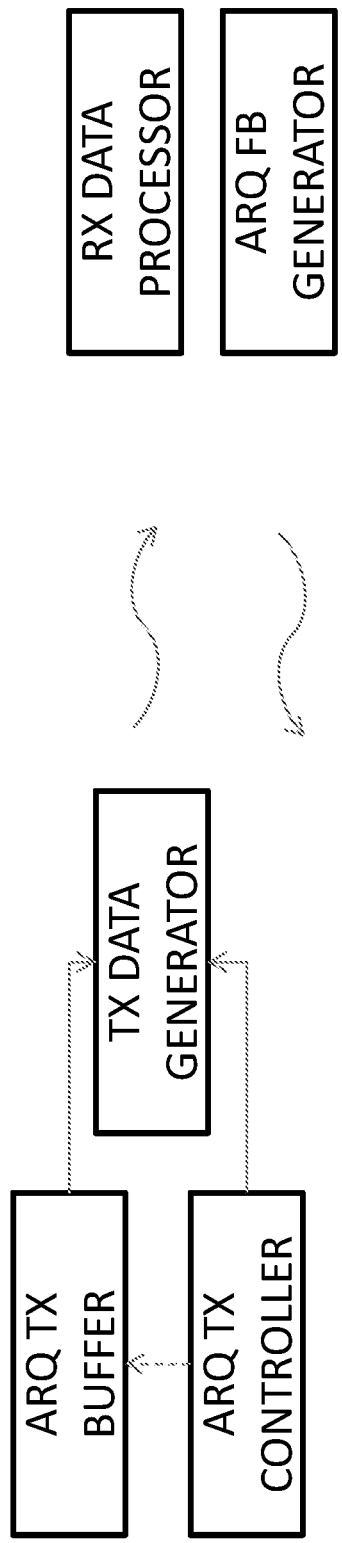
FIG. 3B illustrates an exemplary ARQ processing function in an IBR.

FIG. 3B illustrates an exemplary ARQ processing function in an IBR, comprising an ARQ transmit controller, which adds a set of transmit data to, and removes a set of transmit data from, an ARQ Tx buffer. The ARQ transmit controller also determines a transmit PDU using the contents of the ARQ Tx buffer. The Tx data generator causes the transmit PDU to be transmitted to a receiver using a wireless transmission channel, resulting in either a correct receive PDU or an error indicator at the receive data processor. The ARQ feedback generator uses the correct receive PDU or error indicator to generate an ARQ feedback obtained by the ARQ Tx controller.

Figure 4:
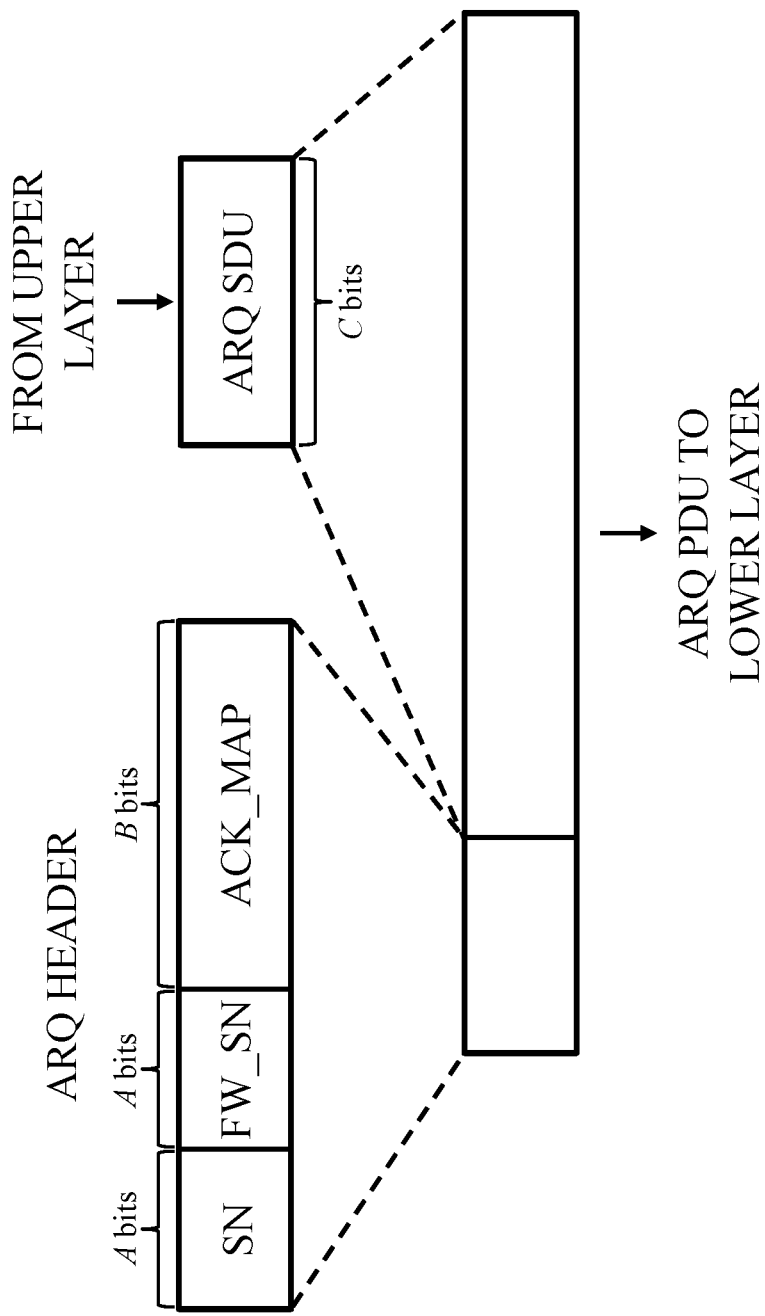
FIG. 4 shows an exemplary ARQ header and ARQ PDU construction.

FIG. 4 illustrates an exemplary operation of the TX data generator, wherein an ARQ header, also known as a header, is added to an IBR to an IBR MAC SDU generates an ARQ PDU. The header consists of three fields: sequence number (SN), first waiting sequence number (FW_SN), and acknowledgment map (ACK_MAP). The space of SNs ranges from 0 to SNMAG−1, where SNMAG<2^A. Each ARQ PDU is assigned a unique SN in the transmitter's sliding window and the SN number is used by the remote end's receiver to ensure in sequence delivery of the MAC SDUs. The FW_SN and ACK_MAP fields describe the current state of the receiver's sliding window (SW) and are used by the remote end's transmitter to determine what ARQ PDUs require retransmission.

Figure 5:
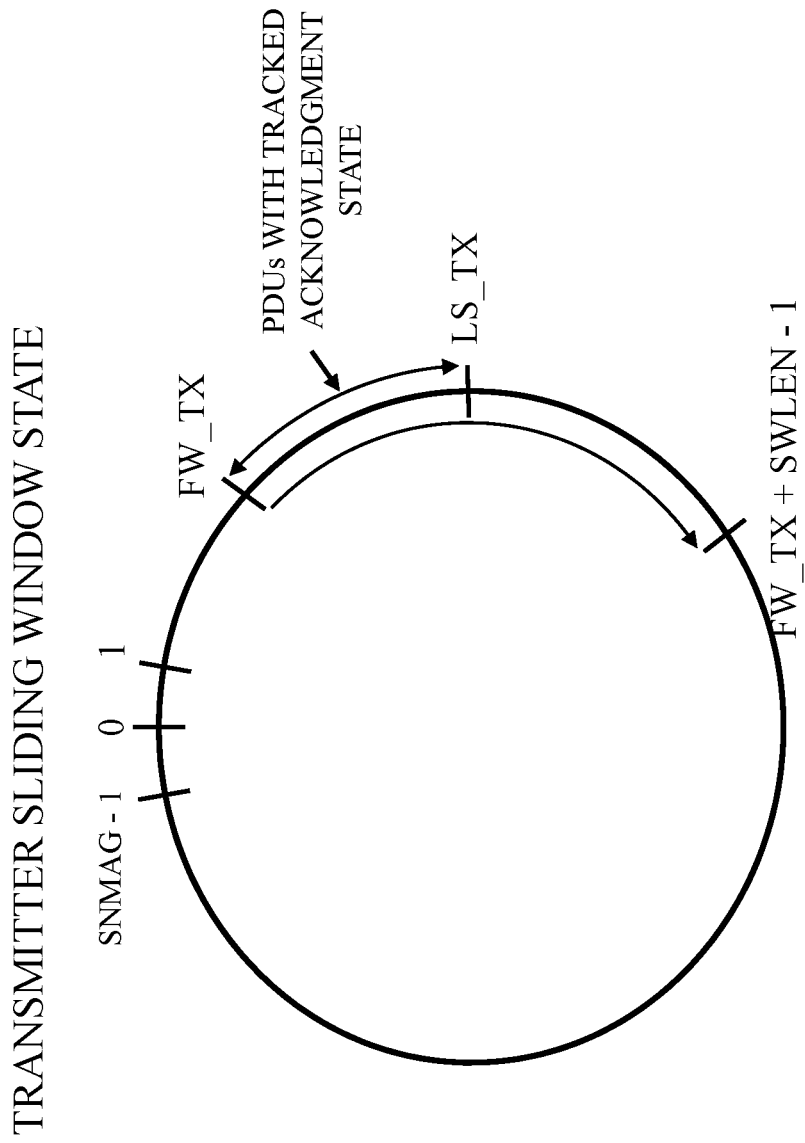
FIG. 5 shows the state variables tracked by the transmitter's sliding window.

FIG. 5 is one example of the transmitter SW state, where each entry in the SW contains metadata describing the PDU's acknowledgment status, time since last retransmission, and time since original transmission. The first waiting (FW_TX) variable is the SN corresponding to the oldest unacknowledged ARQ PDU in the sliding window, and the last sent (LS_TX) variable is the SN corresponding to the most recent ARQ SDU added to the sliding window. Only ARQ PDU's with SNs between FW_TX and LS_TX are stored in memory for possible retransmission. Once a SN is no longer within the sliding window, the corresponding ARQ PDU is removed storage in memory. The maximum number of ARQ PDUs stored within the sliding window is indicated by the constant SWLEN.

Figure 6:
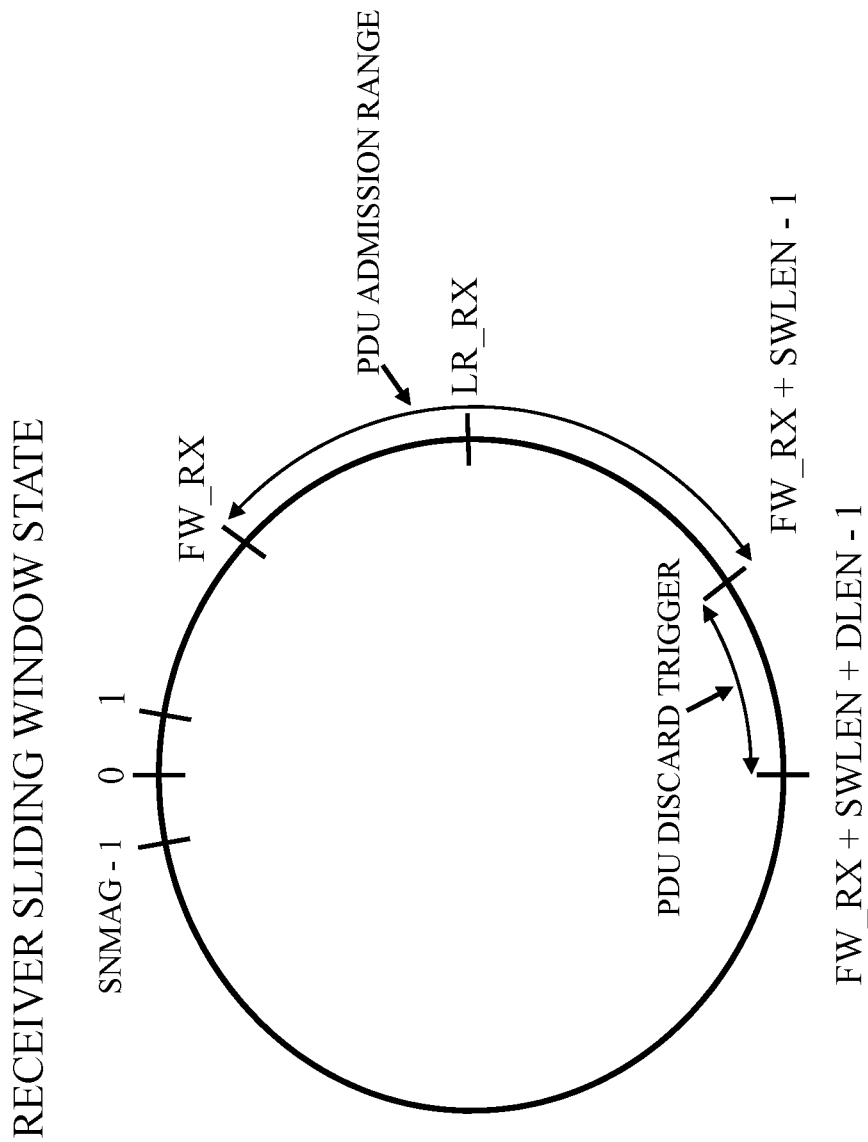
FIG. 6 shows the state variables tracked by the receiver's sliding window.

FIG. 6 is one example of the receiver SW state. The first waiting (FW_RX) variable is the SN corresponding to the oldest ARQ PDU not yet received, and last received (LR_RX) variable is the SN corresponding to the newest ARQ PDU accepted into the SW thus far. Each entry in the SW contains metadata to track if the PDU is received or missing, and the time it was received. This metadata is used by the transmitter to build the ARQ header FW_SN and ACK_MAP fields.

At the transmitter, the ARQ entity selects the symbol stream and subframe slot to send an ARQ PDU belonging one of the following categories: a retransmission of a PDU in the SW, transmission of a new PDU added to the sliding window, or a PDU containing only filler data. Encoding of a ARQ PDU by the lower layers for a specific symbol stream and subframe slot occurs at specific time intervals within a frame, at which the ARQ entity must select a PDU for transmission. After selecting the PDU, the ARQ entity updates the ARQ header fields, as illustrated in FIG. 4, and submits the PDU to the lower layers for encoding and mapping to the transmitter RF chains.

From the transmitter's perspective, each bit in the ARQ header ACK_MAP field indicates if a specific SN in the receiver's SW has been received. The SW is subset of the entire SN space, 0 to SNMAG−1, therefore it is only necessary to map the acknowledgment states starting at FW_RX to FW_RX+SWLEN−1. Since the ACK_MAP field size, B bits, is much smaller than SWLEN, only a small subset of can be sent in each ARQ header field. To provide feedback of the entire SW acknowledgment state, the ACK_MAP field does not point to fixed range of of SNs in the SW but instead points to multiple ranges of SNs in the SW. The range of SNs covered by the ACK_MAP changes with each each transmitted ARQ PDU.

To reduce overhead of the ARQ header, the ACK_MAP's offset in the SW is not explicitly signaled, but uses the FW_SN field already present in the header and the PDU's subframe and symbol stream mapping to determine the exact offset in the SW. The FW_SN field in the ARQ header signals the starting point of the ACK_MAP and either a mathematical function or lookup table, with the subframe position and symbol stream as inputs, determines the exact offset of ACK_MAP starting position defined as SN_MAPOFFSET. The absolute starting position in the sequence number space is defined as SN_MAPSTART=FW_SN+SN_MAPOFFSET+1. As an example, FIG. 7 demonstrates how the entirety SW acknowledgement state is split over multiple ACK_MAPS.

Denote the B bits of the ACK_MAP as b_1, b_2, ..., b_B, where the bit b_i refers to the acknowledgment state of the SN equal to FW_SN+SN_MAPOFFSET+i. The value of 1 indicates acknowledged and the value of 0 indicates unacknowledged. If the SN associated with b_i is outside the receiver's SW, FW_SN+SN MAPOFF SET+i>LR_RX, then b_i is set to 0 for unacknowledged.

The ARQ entity at the transmitter receives a report containing the FW_SN, ACK_MAP, symbol stream index, and subframe slot index from the receiver for each ARQ PDU received error free. First the ARQ entity verifies if the FW_SN is valid, FW_TX≤FW_SN≤LS_TX+1, otherwise the ARQ entity discards the report. If FW_TX<FW_SN, then the PDUs from FW_TX up to FW_SN are acknowledged by the remote end's receiver and can be discarded from the transmitter's SW. The ACK_MAP is processed if the SN space covered by the ACK_MAP is within the transmitter's SW, FW_SN<SN_MAPSTART≤LS_TX, otherwise the ACK_MAP is discarded because it does not contain any relevant acknowledgment information. If the SN associated with b_i, FW_SN+SN_MAPOFFSET+i, is within the transmitter's SW, then the value of b_i is processed. Otherwise, b_i refers to a SN outside of the transmitter's SW and is discarded. If a valid b_i field indicates acknowledgment, then the associated PDU is marked as acknowledged (ACK) in the SW. If a valid b_i field indicates unacknowledged and the time elapsed since that PDU's last transmission is greater than a threshold RETX_THRESH, the PDU is marked as negatively acknowledged (NACK). The RETX_THRESH is a parameter that represents the amount of time required receive feedback from the remote receiver.

Figure 9:
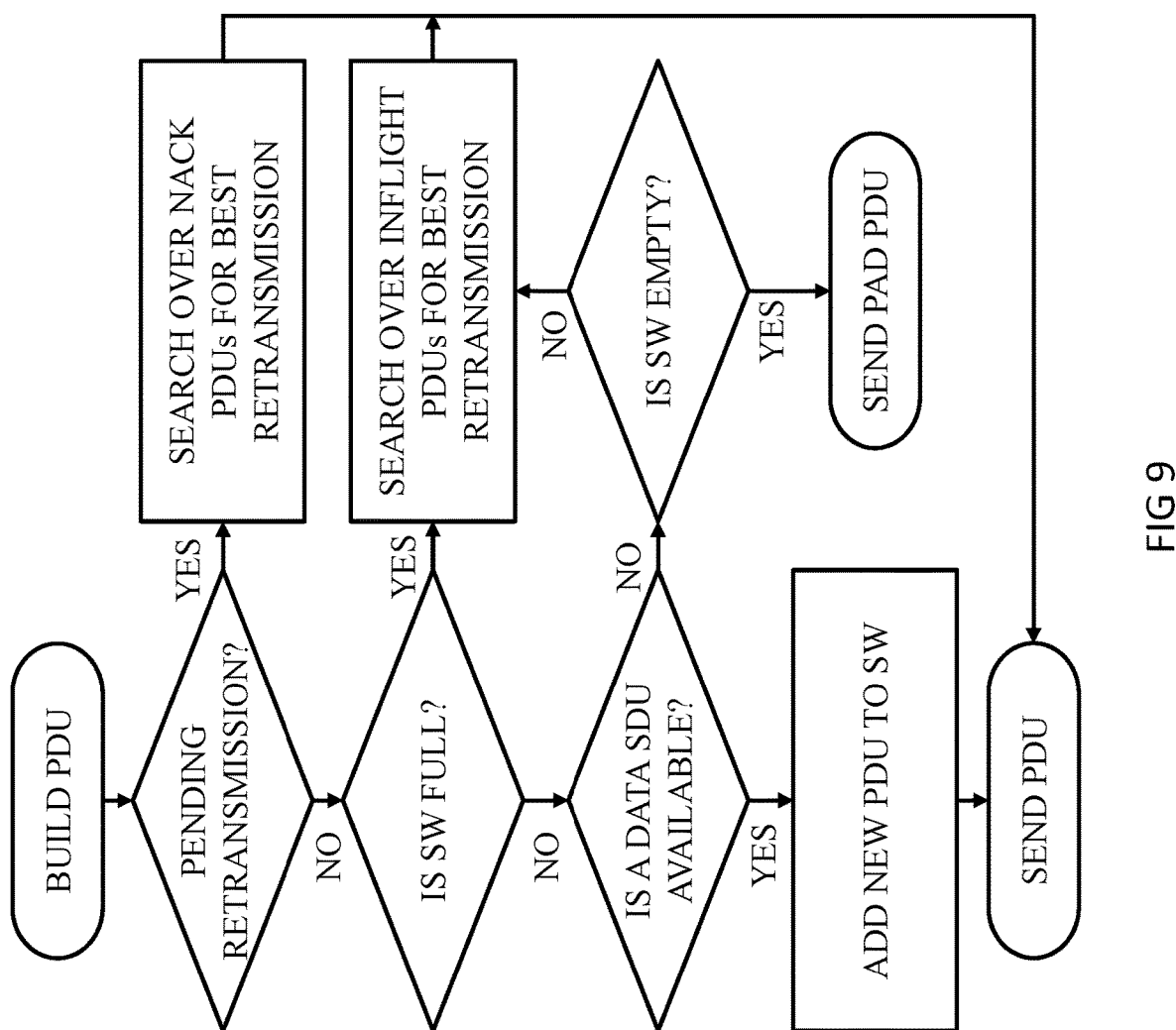
FIG. 9 shows the transmitter's procedure to determine which ARQ PDU to send.

FIG. 9 illustrates how the ARQ entity selects what PDU to transmit at a particular symbol stream and subframe slot. The transmitter tracks the receipt status of PDUs currently present in its SW, and marks the PDUs either as NACK, inflight, or ACK. If one or more ARQ PDUs are marked as NACK, the ARQ entity first searches over the PDUs identified as NACK for the best candidate for retransmission with respect to a heuristic metric. For example, a metric to determine the best retransmission candidate may be, but not limited to, one of the following: the PDU with the longest time since its last retransmission or the PDU with the SN closest to the FW_TX. If the ARQ entity selects a retransmission candidate and submits it to the lower layers for transmission, the selected PDU changes its receipt status to inflight. The inflight state indicates the PDU's ACK or NACK is still pending feedback from remote end's receiver.

If no ARQ PDU with a pending NACK exists, the ARQ entity checks for pending data from the upper layer and the size of its SW. If the SW is not full and the upper layer has data available, the ARQ protocol creates a new ARQ PDU, adds the PDU to the SW, and submits the PDU to the lower layers. To add a PDU to the SW, the ARQ entity sets the PDU's SN to LS_TX+1 and then updates LS_TX=LS_TX+1 as the added PDU is now the newest PDU in the SW.

If the SW is not empty and the upper layer does not have data available, the ARQ entity triggers a proactive retransmission instead of sending only filler data. The ARQ entity searches the PDUs in the SW marked as inflight. Similar to the retransmission of a NACK PDU scenario, the ARQ entity searches over inflight PDUs to identify the PDU with the longest elapsed time since its last retransmission. The receipt status of the PDU does not change from inflight.

If the SW is empty, a filler PDU is sent because there is so other PDU to transmit. A filler PDU shares the same ARQ header format as with regular ARQ PDUs, but its payload contains no data intended for processing by the upper layers. Its SN has a special value to indicate the payload only contains filler data.

Figure 8:
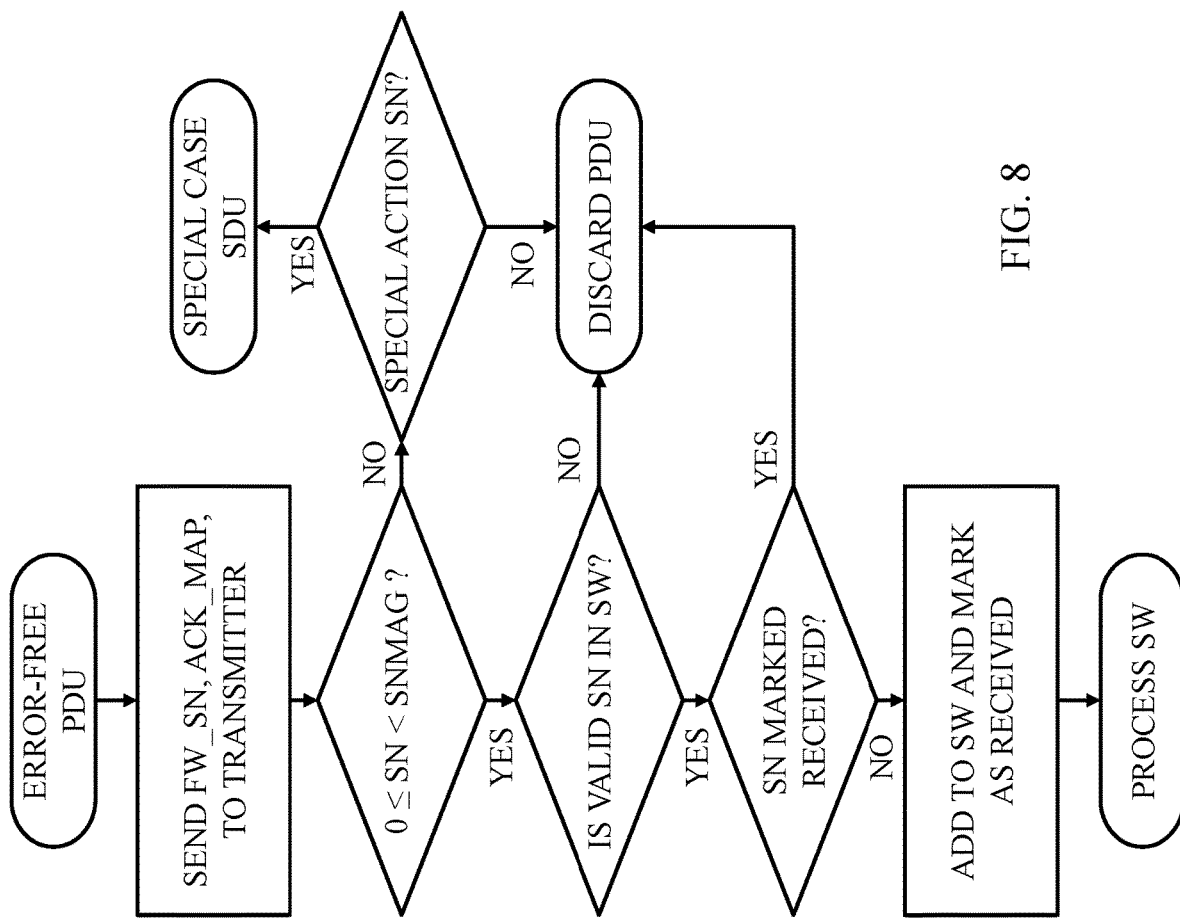
FIG. 8 shows the receiver's procedure to accept or discard an ARQ PDU upon error-free receipt.

FIG. 8 illustrates the receiver ARQ entity's method to accept PDUs into the SW, discard PDUs, and the condition to pass PDUs to the upper layer. The ARQ entity processes an error free PDU from the lower layer, where it is assumed the symbol decoder uses an integrity check to detect any errors. The FW_SN and ACK_MAP fields in the PDU's ARQ header are passed to the transmitter's ARQ entity. The transmitter shall use these fields to determine what PDUs to retransmit.

The ARQ entity first verifies the PDU's SN satisfies the inequality 0≤SN<SNMAG, and if not, the ARQ entity further verifies if the SN indicates a special case outside of the regular ARQ processing. This method bypasses regular ARQ processing and may be used to send short control messaging or SW state feedback. One example is the use of a PDU containing only filler data, which occurs when no data is available for transmission at the transmitter. The receiver immediately discards filler PDUs upon receipt without any further processing. If the SN does not match any special case, then the ARQ entity discards the PDU.

Once the ARQ entity determines the PDU's SN is valid, it checks if the SN fits within the receiver's SW. As shown in FIG. 6, the SN must satisfy the inequality FW_RX≤SN<FW_RX+SWLEN for the ARQ entity to add the PDU to the SW. If the PDU is already present in the SW, the received PDU is a duplicate retransmission and shall be discarded. Otherwise, the PDU data is stored in memory and the SN is marked as received in the SW and the time it was received at is recorded. If the SN=FW_RX, then the ARQ entity releases PDUs in sequence to the upper layer starting at FW_RX up until the next missing PDU.

If the SN satisfies the inequality FW_RX+SWLEN≤SN<FW_RX+SWLEN+DLEN, then the ARQ entity shall advance FW_RX in order to fit the SN within the sliding window, where the new FW_RX=SN−SWLEN+1. Received PDUs between the old FW_RX and the new FW_RX are passed to the upper layer in sequence and any missing PDUs are signaled to the upper layer as discards. The DLEN parameter serves as a method to allow the receiver's SW to resynchronize with the transmitter's SW without waiting for the PDU associated with FW_RX to timeout.

To ensure no PDU remains in the receiver's SW indefinitely, the LS_RX PDU has a time to live (TTL) timer starting at the time the PDU was first admitted to the SW. Upon expiration, the PDUs in the range FW_RX to LS_RX are passed to the upper MAC layer for processing and any missing PDUs are signaled as discards. Lastly, the FW_RX is advanced to LS_RX+1. To prevent the same problem at the transmitter's SW, the FW_TX PDU also has a TTL timer, Upon expiration, FW_TX is discarded from the SW and advanced to FW_TX+1.

In general, QoS traffic levels require different levels of latency and frame loss performance. Instead of using a single ARQ instance to support multiple QoS levels, multiple ARQ instances can operate in parallel supporting each QoS level. This approach avoids funneling data of all QoS types into a single ARQ queue, where retransmissions of low priority traffic may block the transmission of high priority traffic. A scheduler can determine what ARQ instance transmits on a certain symbol stream and subframe slot based on the QoS level, fairness, and number of pending retransmissions.

The SN field in ARQ header supports up $2^A$ possible SNs and it is not necessary for the SNMAG parameter to consume the entirety of the SN space. If there are K QoS levels to process, segment the set of all SNs, 0 to $2^A-1$, into K disjoint sets defined by start and stop SN pairs: (ARQSTART_1, ARQSTOP_1), (ARQSTART_2, ARQSTOP_2), . . . (ARQSTART_K, ARQSTOP_K). Assign QoS level j to ARQ instance j that only processes PDUs with SNs in the range (ARQSTART_j, ARQSTOP_j). By shifting the SN destined to ARQ process j by ARQSTART_j, the previously described SW mechanics remain identical.

Although embodiments of the invention have been described primarily with respect to a backhaul radio, it will be appreciated that embodiments and aspects of the invention are also applicable to fixed wireless access points.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the present invention. The term "computer-readable medium" shall accordingly be taken to include, but not be limited to, solid-state memories, and optical and magnetic media.

Embodiments of the invention have been described through functional modules at times, which are defined by executable instructions recorded on computer readable media which cause a computer, microprocessors or chipsets to perform method steps when executed. The modules have been segregated by function for the sake of clarity. However, it should be understood that the modules need not correspond to discrete blocks of code and the described functions can be carried out by the execution of various code portions stored on various media and executed at various times.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The invention has been described in relation to particular examples, which are intended in all respects to be illustrative rather than restrictive. Those skilled in the art will appreciate that many different combinations of hardware, software, and firmware will be suitable for practicing the present invention. Various aspects and/or components of the described embodiments may be used singly or in any combination. It is intended that the specification and examples be considered as exemplary only, with a true scope and spirit of the invention being indicated by the claims.

What is claimed is:

1. A backhaul radio comprising: a plurality of transmit radio frequency (RF) chains; a plurality of directive gain antenna elements; and an automated repeat request (ARQ) entity, wherein the ARQ entity selects a symbol stream and subframe time slot to send an ARQ protocol data unit (PDU), updating an ARQ header field and submitting the ARQ PDU for encoding and mapping to the transmit RF chains, wherein the ARQ entity is configured to use an ACK_MAP to perform a combination of proactive and reactive retransmissions.

2. The backhaul radio of claim 1, wherein the ARQ entity comprise an ARQ transmit controller and an ARQ transmission buffer, and wherein the ARQ transmit controller is configured to add a set of transmit data to and remove a set of transmit data from the ARQ transmission buffer.

3. The backhaul radio of claim 2, wherein the ARQ transmit controller is further configured to determine a transmit a transmit protocol data unit (PDU), wherein the transmit PDU is configured to be transmitted to a receiver using a wireless transmission channel.

4. The backhaul radio of claim 3, wherein the wireless backhaul radio is configured to receive a correct receive PDU or an error indicator.

5. The backhaul radio of claim 4, wherein the ARQ entity generates an ARQ feedback based on the correct receive PDU or the error indicator.

6. The backhaul radio of claim 2, wherein the ARQ entity further generates the ARQ header, and wherein the ARQ header filed that is updated is an ACK_MAP field.

7. The backhaul radio of claim 1, wherein the ARQ entity further generates the ARQ header, and wherein the ARQ header filed that is updated is an ACK_MAP field.

8. The backhaul radio of claim 1, wherein the ARQ PDU comprises one selected from the group consisting of a retransmission of a PDU in a sliding window, transmission of a new PDU added to the sliding window and a PDU containing only filler data.

9. A backhaul radio comprising:
a plurality of transmit radio frequency (RF) chains;
a plurality of directive gain, antenna elements; and
an automated repeat request (ARQ) entity, wherein the ARQ entity is configured to use an ACK_MAP constructed by a combination of implicit and explicit signaling and perform a combination of proactive and reactive retransmissions.

10. The backhaul radio of claim 9, wherein the ARQ entity comprises an ARQ transmit controller and an ARQ transmission buffer, and wherein the ARQ transmit controller is configured to add a set of transmit data to and remove a set of transmit data from the ARQ transmission buffer.

11. The backhaul radio of claim 10, wherein the ARQ transmit controller is further configured to determine a transmit a transmit protocol data unit (PDU), wherein the transmit PDU is configured to be transmitted to a receiver using a wireless transmission channel.

12. The backhaul radio of claim 11, wherein the wireless backhaul radio is configured to receive a correct receive PDU or an error indicator.

13. The backhaul radio of claim 12, wherein the ARQ entity generates an ARQ feedback based on the correct receive PDU or the error indicator.

14. The backhaul radio of claim 10, wherein the ARQ transmit controller generates an ARQ header, and wherein the ARQ header comprises the ACK_MAP.

15. The backhaul radio of claim 9, wherein the ARQ entity generates an ARQ header, and wherein the ARQ header comprises the ACK_MAP.

16. The backhaul radio of claim 9, wherein the ARQ entity is configured to select a symbol stream and subframe slot to send an ARQ protocol data unit (PDU).

17. The backhaul radio of claim 16, wherein the ARQ PDU comprises one selected from the group consisting of a retransmission of a PDU in a sliding window, transmission of a new PDU added to the sliding window and a PDU containing only filler data.

18. The backhaul radio of claim 16, wherein the ARQ entity is further configured to submit the ARQ PDU for encoding and mapping to transmitter RF chains.

19. A fixed wireless access point comprising: a plurality of transmit radio frequency (RF) chains; a plurality of directive gain antenna elements; and an automated repeat request (ARQ) entity, wherein the ARQ entity selects a symbol stream and subframe time slot to send an ARQ protocol data unit (PDU), updating an ARQ header field and submitting the ARQ PDU for encoding and mapping to the transmit RF chains, wherein the ARQ entity is configured to use an ACK_MAP to perform a combination of proactive and reactive retransmissions.

20. A fixed wireless access point comprising:
a plurality of transmit radio frequency (RF) chains;
a plurality of directive gain antenna elements; and
an automated repeat request (ARQ) entity, wherein the ARQ entity is configured to use an ACK_MAP constructed by a combination of implicit and explicit signaling and perform a combination of proactive and reactive retransmissions.

\* \* \* \* \*